United States Patent
Suzuki et al.

[11] Patent Number: 5,832,226
[45] Date of Patent: Nov. 3, 1998

[54] AGENT DEVICE WITH PROGRAM RECEPTION FUNCTION AND METHOD OF ACCESSING MANAGED OBJECT OF AGENT DEVICE

[75] Inventors: Motohiro Suzuki; Yoshiaki Kiriha, both of Tokyo, Japan

[73] Assignee: NEC Corporation, Tokyo, Japan

[21] Appl. No.: 906,339

[22] Filed: Aug. 5, 1997

[30] Foreign Application Priority Data

Aug. 5, 1996 [JP] Japan .................................. 8-221776

[51] Int. Cl.$^6$ .................................................. G06F 13/00
[52] U.S. Cl. .................................................. 395/200.53
[58] Field of Search ...................... 364/DIG. 1, DIG. 2; 395/200.3, 200.32, 200.33, 200.43, 200.44, 200.46, 200.47, 200.5, 200.51, 200.52, 200.53, 200.54

[56] References Cited

U.S. PATENT DOCUMENTS 5,367,635  11/1994  Bauer et al. ....................... 395/200.51
5,655,081   8/1997  Bonnell et al. ..................... 395/200.32
5,678,006  10/1997  Valizadeh et al. .................. 395/200.02

OTHER PUBLICATIONS

Motohiro Suzuki et al, "Agent Adapting the Delegation—Dynamic Script Binding", General Conference of Electronic Information Communication Society, Mar., 1996 (Communication 2B–900).

*Primary Examiner*—Robert B. Harrell
*Attorney, Agent, or Firm*—Sughrue, Mion, Zinn, Macpeak & Seas, PLLC

[57] ABSTRACT

Upon receiving a program S1 from a manager device M1, a program execution section 2 starts executing the program S1 and calls an API by linking an enhanced operational object EO1. The enhanced operational object EO1 executes the called API. When access to a managed object MO1 is required, the API supplied by a primitive operational object PO1 is called. The primitive operational object PO1 executes the API, accesses the managed object MO1 and returns the result to the enhanced operational object EO1. The enhanced operational object EO1 returns the result to the program S1. The program execution section 2 returns the execution result of the program S1 to the manager device M1.

16 Claims, 31 Drawing Sheets

AGENT DEVICE WITH PROGRAM RECEPTION FUNCTION AND METHOD OF ACCESSING MANAGED OBJECT OF AGENT DEVICE

BACKGROUND OF THE INVENTION

The present invention relates to an agent device used for a network management and, more particularly, to an agent device with program reception function, allowing for program reception.

Referring to FIG. 2 representing an example of the above-described agent device introduced by one of papers contributed to General Conference of Electronic Information Communication Society held on March, 1996 (communication 2B-900) titled "Agent adapting the delegation—dynamic script binding", the agent device is designed to execute a script describing management operations (hereinafter referred to as a program) sent from a device executing network management (hereinafter referred to as a manager device) on a device for executing actual management (hereinafter referred to as an agent device).

FIG. 34 shows an example of a conventional agent device.

Referring to FIG. 34, the agent device 3401 comprises a program execution section 3402 and a program execution information memory section 3404.

The program execution section 3402 comprises, for example, a program S1 transmitted from a manager device M1 and being executed and access control means 3403 for preventing execution of the illegal instruction contained in the program S1 being executed. FIG. 34 shows only three manager devices M1, M2 and M3 and one program S1 being executed. However plural manager devices M1 to Mk (k is any integer) and plural programs S1 to Sm (m is any integer) being executed can be used for any actual cases.

The program execution information memory section 3404 has a function of storing managed operational objects 01 and 02. Although FIG. 34 shows only two managed operational objects 01 and 02, there can be plural managed operational objects 01 to On (n is any integer) existing in the actual system.

Each of the managed operational objects 01 and 02 has a function for supplying the script describing management operation inherent in the agent device to the program S1 being executed through an application program interface (hereinafter referred to as API) providing the managed object operation. The managed operation objects 01 and 02 retain delegation of the operation to the respective managed objects for accessing (read only, read and write enabled and non-accessible).

Referring to FIG. 35, the operation of the above-constructed conventional agent device 3401 is described.

For example, it is assumed that the program execution section 3402 of the agent device 3401 receives the program S1 from the manager device M1 (step S3501). Then the access control means 3403 checks whether each operation delegation held by the managed operational objects 01 and 02 deviates from the management delegation preliminarily assigned to the manager device M1 (step S3502). It is further judged whether or not the operation delegations of all the managed operational objects 01 and 02 do not deviate (step S3503). When the result at step S3503 shows that there is no deviation with respect to all the managed operational objects 01 and 02, the program execution section 3402 links the required managed operational objects 01 and 02 (step S3504). Then the program S1 enabled by the result at step S3504 is executed (step S3505). The program execution section 3402 returns the execution result to the manager device M1 (step S3507).

If at least one deviation of the management delegation is detected at step S3503, the program execution section 3402 stops execution of the program S1 and outputs an error (step S3506). The program execution section 3402 returns the execution result to the manager device M1 (step S3507).

For the aforementioned conventional art, it is very difficult to realize the managed operational objects 01 and 02. This is because that the sequence from access to achieve the management function with respect to the managed object is realized within each of a single management operational object 01 and 02.

SUMMARY OF THE INVENTION

It is an objective of the present invention to provide an agent device with program reception function that clearly defines the method of accessing the managed object by providing an enhanced operational object, primitive operational object and managed object access object and defining each function and operation supplied by the respective objects.

The agent device with program reception function as the first aspect of the present invention is so proposed to comprise a program execution section (a reference numeral 2 of FIG. 1) having functions of executing the program transmitted from a manager device, linking enhanced operational objects(EO1 and EO2 of FIG. 1) required in the program being executed to the program and transmitting the program execution result to the manager device; program execution information memory section for storing the enhanced operational objects (EO1 and EO2 of FIG. 1) realizing efficient functions of network management such as path tracing, event management or the like and supplying those functions as API to the program as well as the primitive operational objects (PO1, PO2, PO3 of FIG. 1) supplying the function to allow the enhanced operational object to access the managed object as the API; and management information memory section (reference numeral 4 of FIG. 1) for storing the managed object obtained by abstracting the actual target intended for the management such as an exchange office.

The agent device with program reception function of the second aspect of the present invention is provided by adding a managed object operation section (reference numeral 55 of FIG. 5) for supplying the access interface with the existing system (hereinafter referred to as the existing management system) that manages the managed object in the form of, for example, an exchange office to the construction of the agent device with program reception function of the first aspect of the present invention. The above-added section does not have to incorporate the operation dependent upon the respective managed objects into the primitive operational objects, thus allowing for the access to the managed object in a uniform manner. As a result, the primitive operational object can be designed and mounted in such a way that does not depend upon the change in mounting the managed object, improving module capability of the primitive operational object as well as broadening the application range thereof.

The agent device with program reception function of the third aspect of the present invention is realized by replacing the enhanced operational object and the primitive operational object of the agent device with program reception function of the construction of the first aspect of the present invention with a managed object access object (AO1 of FIG. 8) for supplying the function of accessing one managed object directly and simultaneously to the program as the API. The aforementioned managed object access object allows the program to write the instruction to directly access the managed object. When writing the management operation required for the access to the managed object, flexible script relating to the one supplied by the enhanced operational object but not limited thereto can be obtained.

The agent device with program reception function of the fourth aspect of the present invention is realized by adding the managed object operation section (reference numeral 55 of FIG. 11) for providing access interface with the existing management system to the agent device with program reception function of the third aspect of the present invention. As a result, no operation dependent on the respective managed objects is required to be incorporated into the managed object access object, thus allowing for the access to the managed object in a uniform manner. Therefore the managed object access object independent on the change in mounting the managed object can be designed and mounted so as to improve module capability of the managed object access object as well as broadening the application range thereof.

The agent device with program reception function of the fifth aspect of the present invention is realized by adding a managed object access object (AO1 of FIG. 14) of the agent device with program reception function of the third aspect of the present invention to the construction of the agent device with program reception function of the first aspect of the invention. The above-realized construction simplifies script description resulted from programming with the API supplied by the enhanced operational object as well as improving flexibility in script description because the instruction to directly access the managed object can be described within the program through the API supplied by the managed object access object.

The agent device with program reception function is realized by adding the managed object operation section (55 of FIG. 16) for supplying access interface with the existing system to the construction of the agent device with program reception function of the fifth aspect of the present invention. In addition to the effect provided by the agent device with program reception function of the fifth aspect of the present invention, each module capability and application range of the primitive operational object and the managed object access object can be improved.

The agent device with program reception function of the first aspect or the sixth aspect of the present invention uses the method described below to access from the program to the managed object. The primitive operational object provides the enhanced operational object with the function of accessing the managed object that holds the management information as API. The enhanced operational object processes attribute information of the managed object that has been collected through the API provided by the primitive operational object. As a result, the management function requiring complex information processing such as path tracing, event management or the like can be realized. The interface with the above-described functions is supplied to the program as the API. The program uses the API supplied from the enhanced operational object so as to access the managed object through the enhanced operational object and the primitive operational object. When executing direct access from the program to the managed object, the API supplied from the managed object access object can be used so as to access the managed object through the managed object access object.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
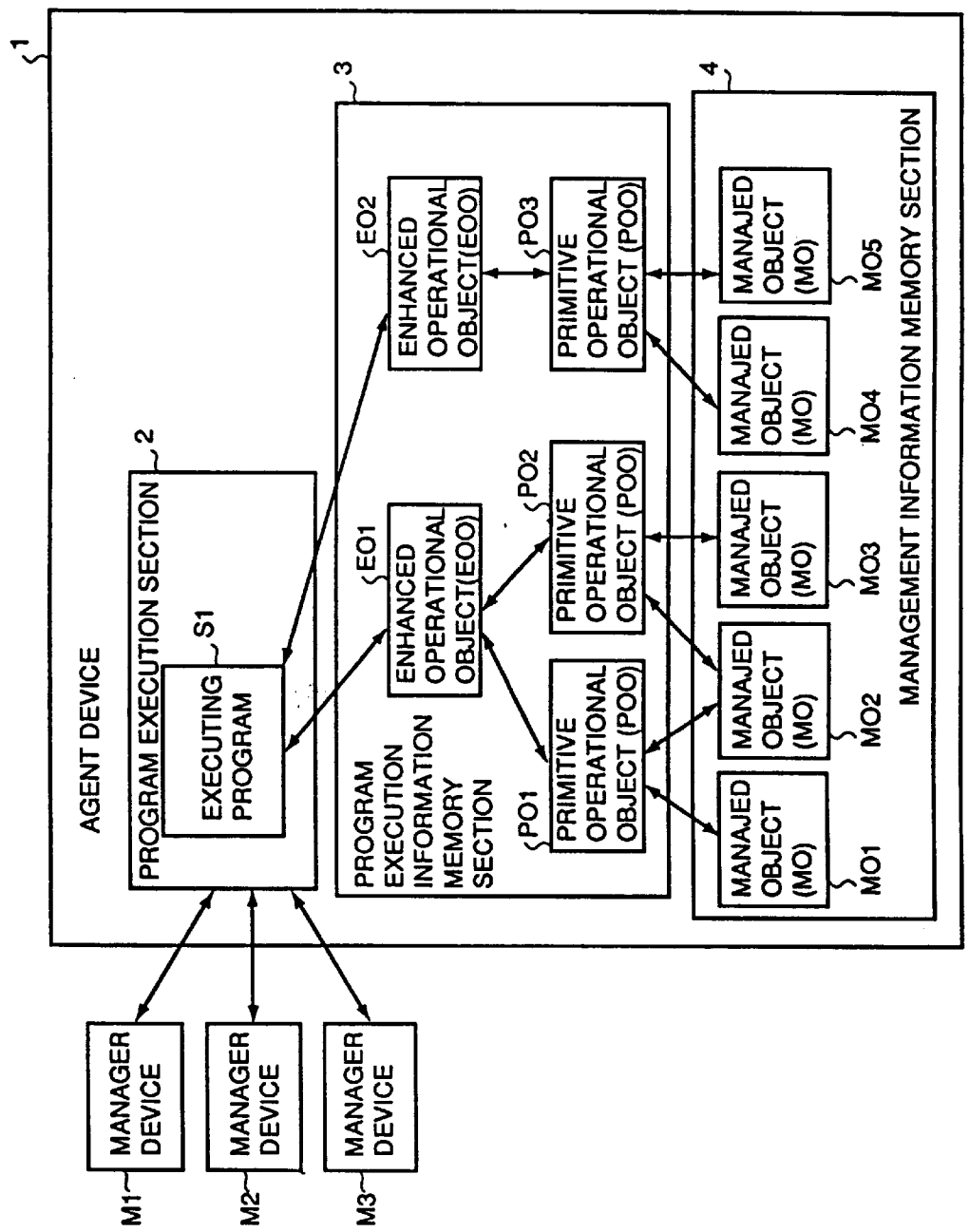
FIG. 1 is a block diagram showing a construction of an agent device with program reception function of a first embodiment of the present invention.

The present invention is described in detail referring to the drawings.

FIG. 1 is a block diagram representing a construction of an agent device with program reception function (hereinafter simply referred to as an agent device) of the first embodiment of the present invention. A major part of the agent device 1 of the first embodiment comprises a program execution section 2, program execution information memory section 3 and a management information memory section 4.

The program execution section 2 has a function of receiving a program S1 transmitted from the manager devices M1, M2, M3 or other agent device, executing the program S1 and transmitting the execution result to the request source. FIG. 1 shows only three units of manager devices, M1, M2 and M3 and one program S1 being executed. However, plural manager devices M1 to Mk and plural programs S1 to Sm being executed can be used.

The program execution information memory section 3 has a function of storing the enhanced operational objects EO1, EO2, the primitive operational objects PO1, PO2, PO3, the program template transmitted to other agent device, name conversion information used by the enhanced operational objects EO1, EO2 and the primitive operational objects PO1, PO2 and PO3 and network structure information required for communication with other agent devices. The name conversion information has two types, a conversion table for converting the abstract name that can be easily understood by the network manager, for example, "node__ A", "path A" into the distinguished name (hereinafter referred to as DN) and attribute label that specify the managed object as the application language data type such as Java, Tcl and vice versa in a correlative manner (hereinafter referred to as a name conversion table) and a conversion table for converting the abstract syntax notation one (hereinafter referred to as ASN.1) data type realized by C or C++ into the application language data type and vice versa (hereinafter refereed to as the data conversion table). The network structure information stands for the table containing identifier of each path, identifier of the device on the path and the identifier of the agent device that manages the device, respectively. FIG. 1 shows only two enhanced operational objects EO1, EO2 and three primitive operational objects, PO1, PO2 and PO3. However plural enhanced operational objects EO1 to EOs and plural primitive operational objects PO1 to POt (s, t are each any integer) can be used. Each of the primitive operational objects PO1, PO2 and PO3 has functions of providing capability to access the managed objects MO1, MO2, MO3, MO4 and MO5 required by the enhanced operational objects EO1 and EO2 in the form of the API, and executing correlative conversion between ASN.1data type realized by C or ++C and the application language data type. The data conversion table stored in the program execution memory section 3 is used for the conversion. The argument of the API supplied by the respective primitive operational objects PO1, PO2 and PO3 is provided with the DN and the attribute label of the managed object written in the application language data type. The return value is likewise the attribute information of the managed objects written in the application language data type.

The enhanced operational objects EO1 and EO2 use the API supplied by the primitive operational objects PO1, PO2 and PO3 in order to realize a series of management functions requiring complex processing such as path tracing, event management and the like. The enhanced operational objects EO1 and EO2, therefore, has functions of providing the interface with the above-described management function to the program in the form of the API, converting an abstract name given as the argument into the DN and attribute label of the managed object written as the application language data type, processing the attribute information of the managed object supplied from the primitive operational objects PO1, PO2 and PO3 into a style required by the program, and executing communication with the other agent device. The enhanced operational objects EO1 and EO2 are allowed to use functions of plural primitive operational objects, for example, PO1 and PO2.

The execution information memory section 4 has a function of storing the managed objects MO1, MO2, MO3, MO4 and MO5 obtained by abstracting the actual target intended for the management. FIG. 1 shows only five units of the managed objects MO1, MO2, MO3, MO4 and MO5. However more managed objects MO1 to MOx (x is any integer) can be used.

Figure 2:
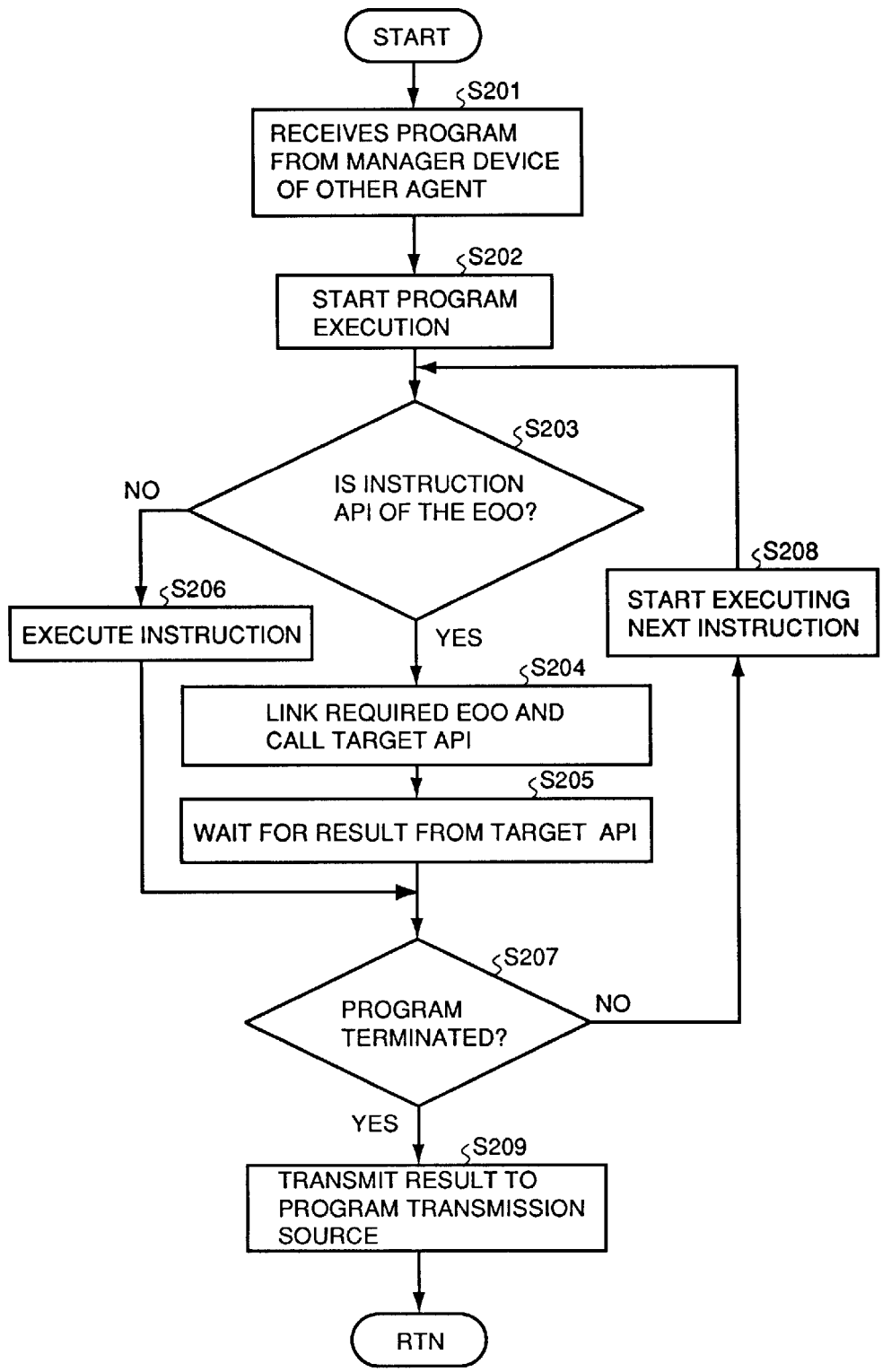
FIG. 2 is a flowchart representing a flow of operations executed by a program execution section shown in FIG. 1.
Figure 3:
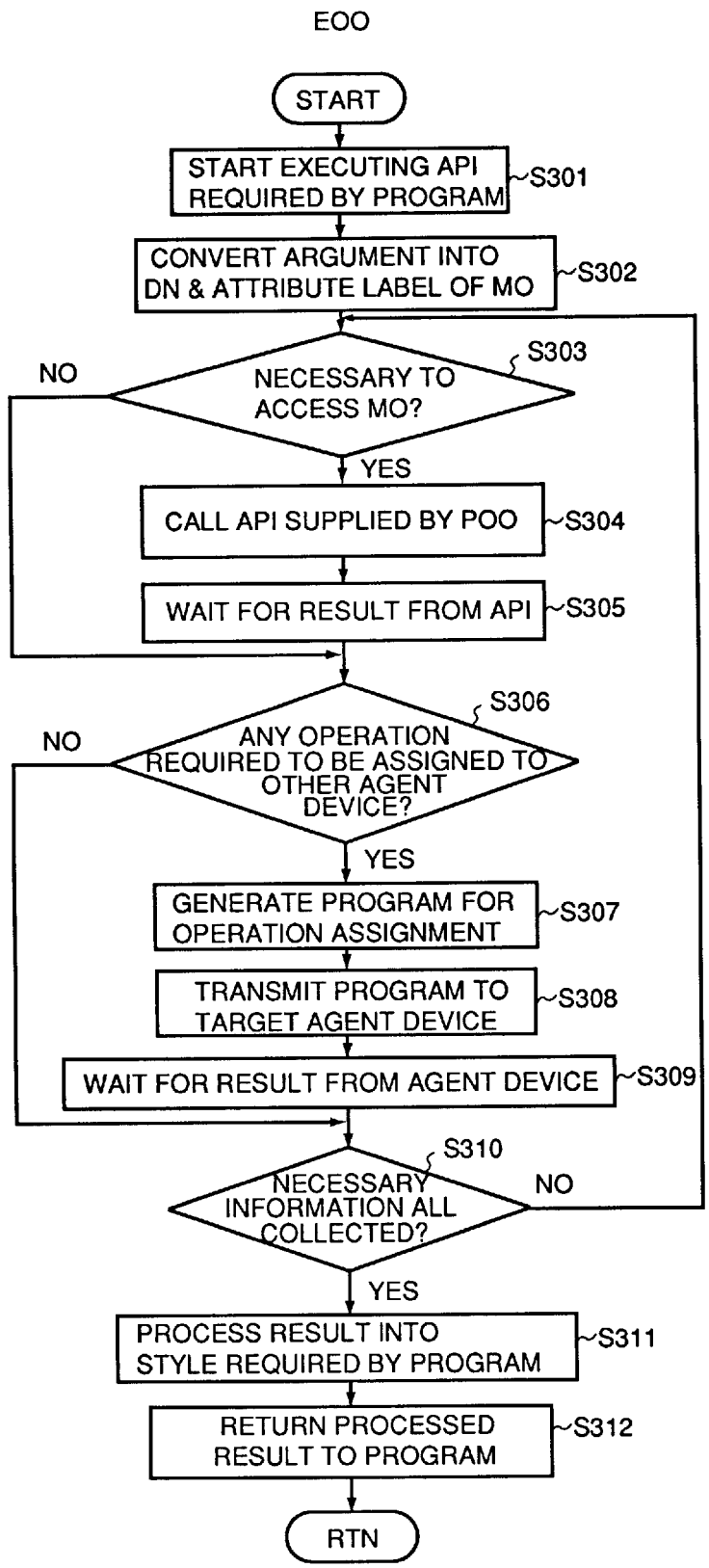
FIG. 3 is a flowchart representing a flow of operations of an enhanced operational object shown in FIG. 1.
Figure 4:
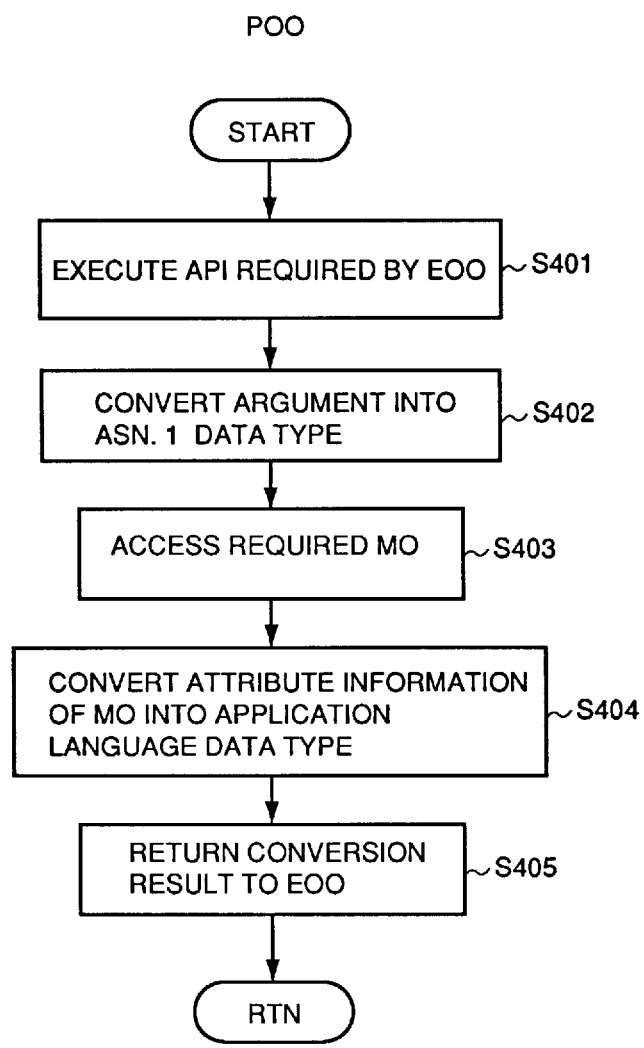
FIG. 4 is a flowchart representing a flow of operations of a primitive operational object shown in FIG. 1.

FIG. 2 to FIG. 4 are flowcharts each representing the processing of the program execution section 2, enhanced operational objects EO1, EO2 and the primitive operational objects PO1, PO2 and PO3 shown in FIG. 1.

The operation of the above-constructed agent device of the first embodiment is described referring to the drawings.

FIG. 2 is a flowchart showing the flow of operations executed by the program execution section 2.

For example, upon receiving the program S1 from the manager device M1 (step S201), the program execution section 2 starts executing the received program S1 (step S202). The program execution section 2 checks if the instruction intended for execution is the API supplied by the enhanced operational objects EO1 and EO2 (step S203).

When the result at step S203 shows that the instruction is the API supplied by the enhanced operational objects EO1 and EO2, the program execution section 2 links the enhanced operational object supplying the API, for example, the enhanced operational object EO1 and calls the required API (step S204). The obtained argument is specified as an abstract name such as "node_A". Then the program execution 2 waits until it receives the result from the API (step S205).

The enhanced operational object EO1 that supplies the required API starts processing as shown in FIG. 3.

The enhanced operational object EO1 starts executing the API required by the program S1 (step S301). Then the enhanced operational object EO1 converts the argument specified as the abstract name given by the program S1 into the DN and attribute label of the managed object written in the application language data type (step S302). The name conversion table stored in the program information memory section 3 is used for the conversion. The enhanced operational object EO1 further checks if it is necessary to access the managed object (step S303).

When the result at step S303 shows necessity of accessing the managed object, the enhanced operational object EO1 calls the API supplied by the primitive operational object, for example, PO1 (step S304). The obtained argument is in the form of the DN and attribute label of the managed object converted at step S302. Then the enhanced operational object EO1 waits until it receives the result of the called API (step S305).

The primitive operational object PO1 that supplies the required API starts processing as shown in FIG. 4.

The primitive operational object PO1 starts executing the API required by the enhanced operational object EO1 (step S401). The primitive operational object PO1 converts the DN and attribute label of the managed object given from the enhanced operational object EO1 and specified as the application language data type into ASN.1 data type realized by C or C++ that can be actually accessed (step S402). The data conversion table stored in the program execution information memory section 3 is used for the conversion. Then the primitive operational object PO1 accesses the required managed objects, for example, MO1 and MO2 based on the converted DN and attribute label of the managed object (step S403). The primitive operational object PO1 converts the data type of each attribute information of the managed objects MO1 and MO2 written in ASN.1 obtained at step S403 into the application language data type (step S404). The data conversion table stored in the program execution information memory section 3 is used for the conversion. The primitive operational object PO1 returns the conversion result to the enhanced operational object EO1 (step S405).

Further operation of the enhanced operational object EO1 is described below.

When the result at step S303 shows no necessity to access the managed object, or the primitive operational object PO1 returns the result at step S305, the enhanced operational object EO1 checks if there are any processing that requires other agent device to complete the management function (step S306).

When execution of the process is assigned to other agent device, the enhanced operational object EO1 generates a program for requesting the other agent device to execute the process (step S307). The program generated at step S307 is obtained by adding such information as the DN and attribute label of the managed object intended for the access or the identifier of the agent device of the transmission source to the template of the program preliminarily stored in the program execution information memory section 3. The enhanced operational object EO1 transmits the program generated at step S307 to the target agent device (step S308). In order to search the target agent device, the network structure information preliminarily stored in the program execution information memory section 3 is used. The enhanced operational object EO1 waits until it receives the program execution result from the agent device (step S309).

The result at step S310 shows that there is no required process assigned to other agent device, or the result at step S309 shows that the execution result of the program is obtained from the agent device, the enhanced operational object EO1 checks if all the necessary management information has been collected (step S310).

The result at step S310 shows that all the necessary management information has been collected, the enhanced operational object EO1 processes the collected management information into the style required by the program S1 (step S311). For example, this process includes calculation of the accumulation value or the ratio using statistical data. Then the enhanced operational object EO1 returns the execution result to the program S1 that calls the API supplied thereby (step S312).

When the result at step S310 shows that the necessary information has not been collected yet, the enhanced operational object EO1 repeats the process starting from step S303.

The subsequent operation of the program execution section 2 is described below.

When the result at step S203 shows that the instruction is not the API supplied by the enhanced operational objects EO1 and EO2, the program execution section 2 executes the instruction (step S206). Then the program execution section 2 checks if the program S1 is terminated upon the instruction executed at step S206 or step S205 (step S207).

When the result at step S207 shows that the program S1 cannot be terminated, the program execution section 2 starts executing the next instruction (step S208).

When the result at step S207 shows that the program S1 is terminated, the program execution section 2 transmits the execution result of the program S1 to the manager device M1 (step S209).

Next an agent device 1 of the second embodiment of the present invention is described in detail referring to the drawings.

Figure 5:
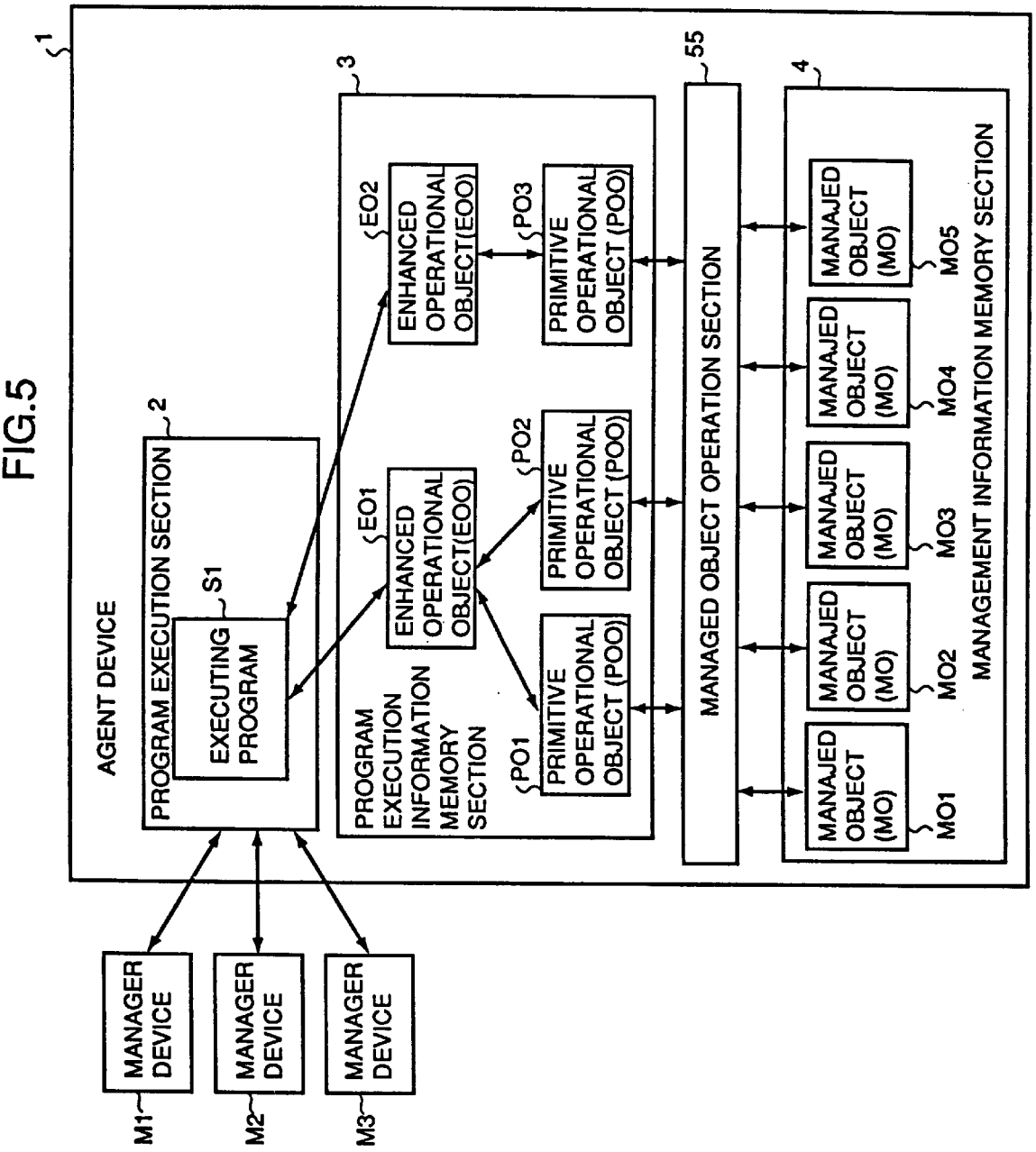
FIG. 5 is a block diagram showing a construction of an agent device with program reception function of a second embodiment of the present invention.

FIG. 5 is a block diagram of the agent device 1 of the second embodiment. The construction of the agent device 1 of the second embodiment is characterized by adding a managed object operation section 55 to the agent device 1 of the first embodiment as shown in FIG. 1. The managed object operation section 55 has a function of supplying uniform interface for accessing the managed objects MO1, MO2, MO3, MO4 and MO5 within the existing management system as the API.

The operation of the agent device 1 of the above-constructed second embodiment is described referring to the drawings.

Figure 6:
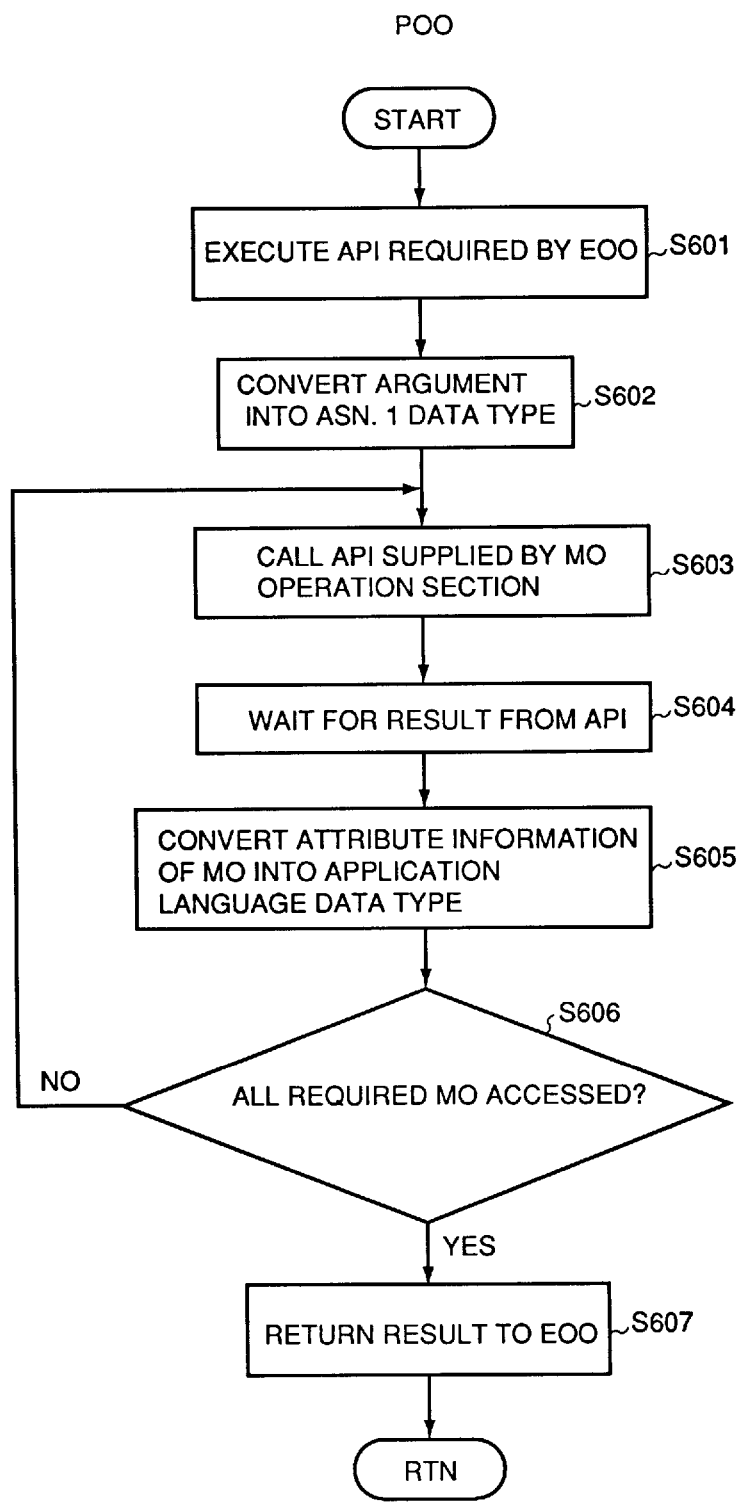
FIG. 6 is a flowchart representing a flow of operations of a primitive operational object shown in FIG. 5.

The difference in operation of the agent device 1 between the first embodiment and the second embodiment is that the flowchart representing the operation of the primitive operational objects PO1, PO2 and PO3 shown in FIG. 4 is changed to the flowchart shown in FIG. 6. Therefore explanation of the respective operations of the program execution section 2 and the enhanced operational objects EO1 and EO2 shown in FIG. 2 and FIG. 3 is omitted.

It is assumed that the enhanced operational object EO1 calls the API supplied by the primitive operational object PO1. Then the primitive operational object PO1 starts processing as shown in FIG. 6.

The primitive operational object PO1 starts executing the API required by the enhanced operational object EO1 (step S601). The argument to the API is the DN and attribute label of the managed object required for accessing the managed object written in the application language data type. Then the primitive operational object PO1 converts the argument into the ASN.1 data type realized by actually accessible C or C++ (step S602). The data conversion table stored in the program execution information memory 3 is used for the conversion. Then the primitive operational object PO1 calls the AP1 supplied by the managed object operation section 55 in order to access required managed objects, for example, managed objects MO1 and MO2 (step S603). At this time, the argument provided to the API is the DN and attribute label of the managed object that has been converted at step S602. Then the primitive operational object PO1 waits until it receives the result from the called API (step S604).

Figure 7:
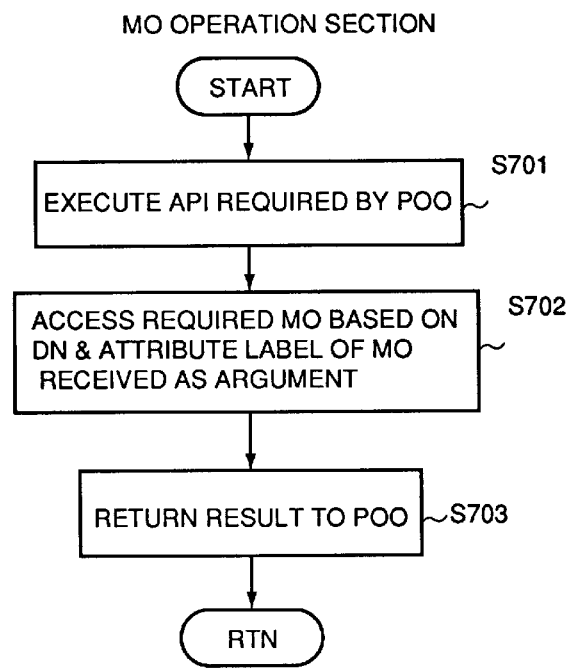
FIG. 7 is a flowchart representing a flow of operations executed by a managed object operation section shown in FIG. 5.

The managed object operation section 55 that supplies the API required by the primitive operational object PO1 starts operating as shown in FIG. 7.

The managed object operation section 55 starts executing the API required by the primitive operational object PO1 (step S701). The managed object operation section 55 accesses the target managed object based on the DN and attribute label of the managed object given by the primitive operational object PO1 as the argument (step S702). The managed object operation section 55 returns the accessed result to the primitive operational object PO1 (step S703).

Receiving the value returned from the called API, the primitive operational object PO1 converts the attribute information written in ASN.1 data type into the application language data type (step S605). The data conversion table stored in the program execution information memory section 3 is used for the conversion. Subsequently the primitive operational object PO1 checks if a required managed objects have been accessed (step S606).

When the result at step S606 shows that the primitive operational object PO1 has accessed all managed objects, the attribute information of the converted managed object is returned to the enhanced operational object EO1 (step S607).

When the result at step S606 shows that all managed objects have not been accessed yet, the process is returned to step S603 for execution again.

The agent device 1 of the second embodiment provides the following advantageous effect. As the managed object operation section 55 provides the uniform interface relating to the access to the managed object, mounting the managed object is shielded from the primitive operational objects PO1, PO2 and PO3. Even when mounting of the managed object is changed, the primitive operational objects PO1, PO2 and PO3 do not have to be changed, thus improving module capability of the primitive operational objects PO1, PO2 and PO3. This effect allows the managed object operation section 55 to use the existing API, leading to broadened application range of the program execution memory section 3.

The agent device of the third embodiment of the present invention is described in detail referring to the drawings.

Figure 8:
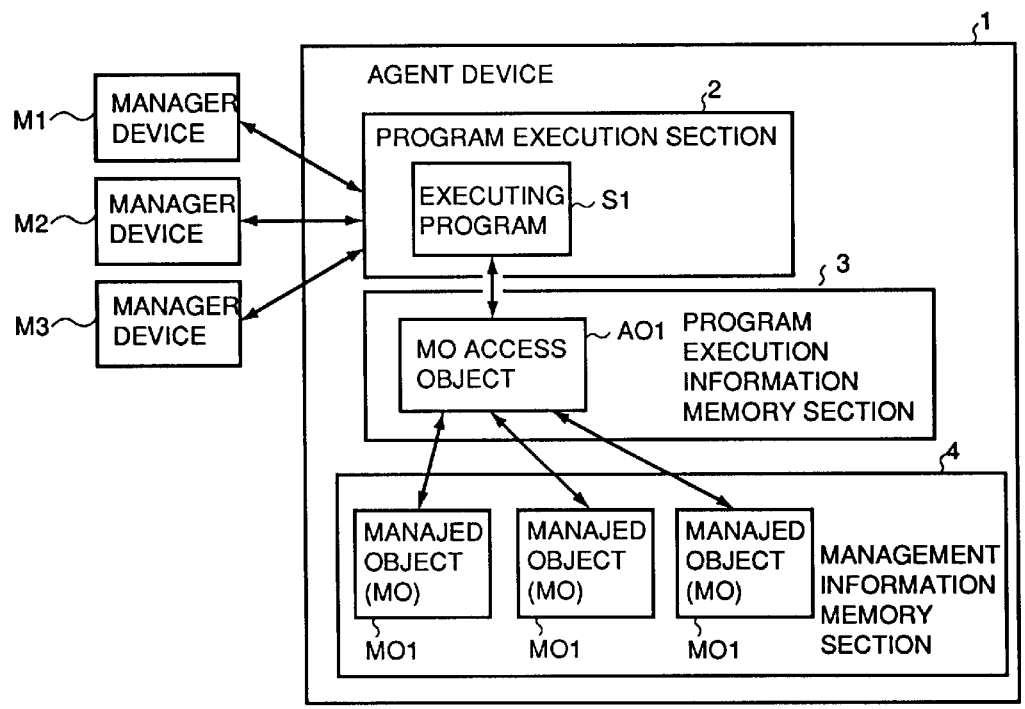
FIG. 8 is a block diagram showing a construction of an agent device with program reception function of a third embodiment of the present invention.

FIG. 8 is a block diagram representing a construction of the agent device 1 of the third embodiment. The construction of the agent device 1 of the third embodiment is characterized by that the program execution information memory section 3 stores a managed object access object AO1 instead of the enhanced operational objects EO1, EO2 and primitive operational objects PO1, PO2 and PO3 compared with the first embodiment. The managed object access object AO1 provides the function to directly access one managed object, for example, MO1 in the form of API.

The operation of the above-constructed agent device 1 of the third embodiment is described referring to the drawings.

Figure 9:
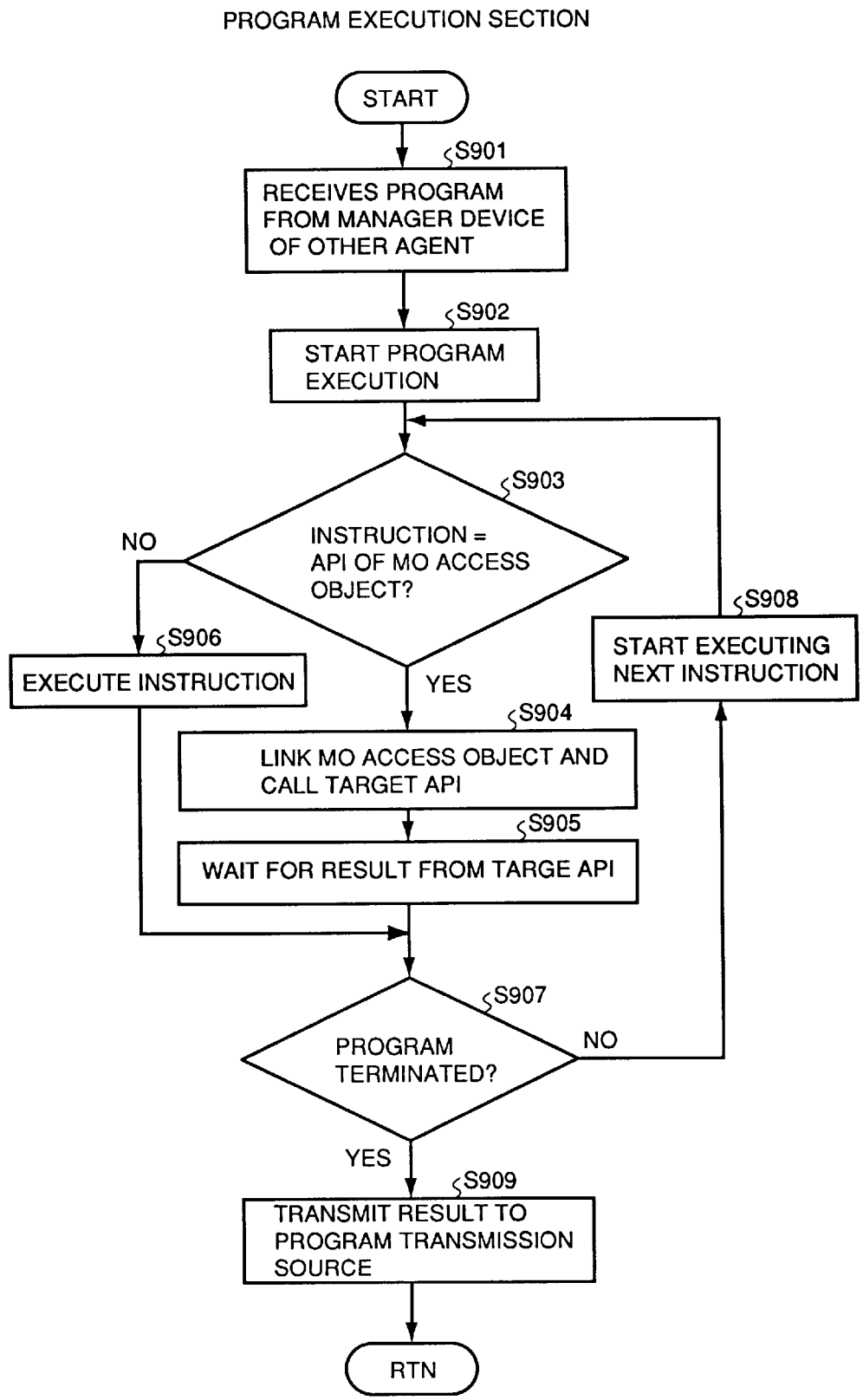
FIG. 9 is a flowchart representing a flow of operations executed by a program execution section shown in FIG. 8.

FIG. 9 is a flowchart showing the flow of operations of the program execution section 2.

For example, it is assumed that the program execution section 2 receives the program from the manager device M1 (step S901). The program execution section 2 starts executing the received program (step S902). Then the program execution section 2 checks if the instruction intended for execution is identical to the API supplied by the managed object access object AO1 (step S903).

When the result at step 903 shows that the instruction is identical to the API supplied by the managed object access object AO1, the program execution section 2 links the managed object access object AO1 and calls the required API (step S904). At this time the argument given to the API is the DN and attribute label of the managed object intended for access written in application language data type. Then the program execution section 2 waits until it receives the result from the API (step S905).

Figure 10:
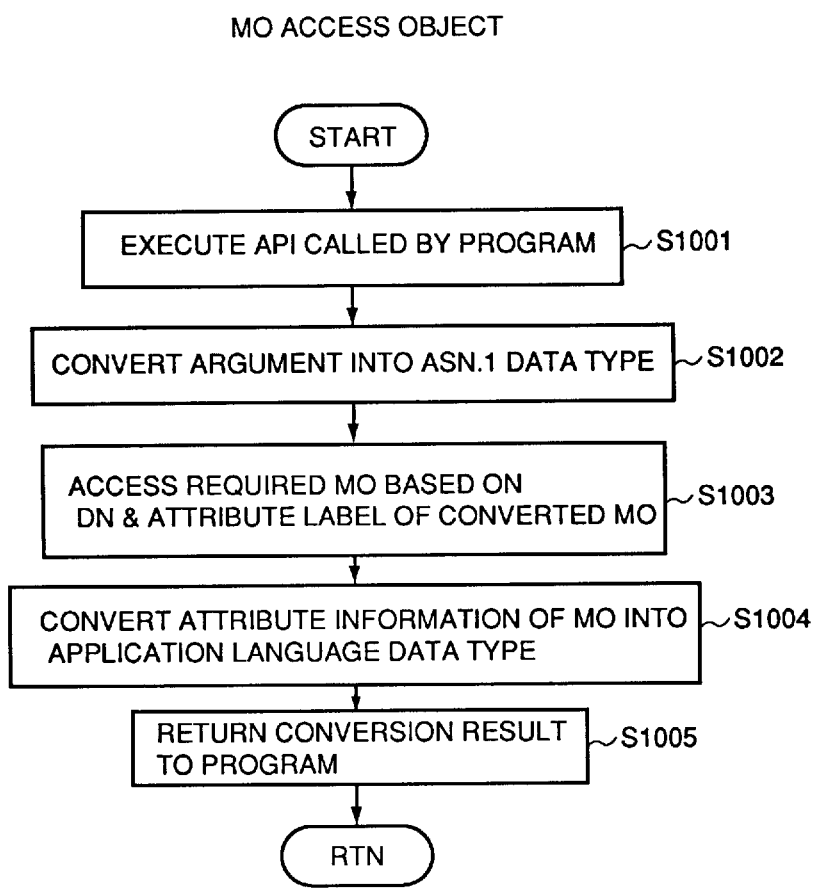
FIG. 10 is a flowchart representing a flow of operations of a managed object access object shown in FIG. 8.

The managed object access object AO1 supplying the required API starts executing the process shown in FIG. 10.

The managed object access object AO1 starts executing the API required by the program S1 (step S1001). The managed object access object AO1 converts the DN and attribute label of the managed object given as the argument into the ASN.1 data type realized with C or C++ that is actually accessible (step S1002). The data conversion table stored in the program execution information memory section 3 is used for the conversion. Then the managed object access object AO1 accesses the required managed object, for example, MO1 based on the DN and attribute label of the managed object converted at step S1002 (step S1003). Then the managed object access object AO1 converts the attribute information of the managed object MO1 written in the ASN.1 data type obtained at step S1003 into the application language data type (step S1004). The data conversion table used at step S1002 is also used for the conversion. The managed object access object AO1 returns the attribute information of the converted managed object MO1 to the program S1 (step S1005).

The subsequent operation of the program execution section 2 is described below.

When the result at step S903 shows that the instruction is not identical to the API supplied by the managed object access object AO1, the program execution section 2 executes the instruction (step S906). Then the program execution section 2 checks if the program is terminated by the instruction executed at step S905 (step S907).

When the result at step S907 shows that the program S1 is not terminated, the program execution section 2 starts the next instruction (step S908).

When the result at step S907 shows that the program S1 is terminated, the program execution section 2 transmits the result of executing the program S1 to the manager device M1 (step S909).

As the third embodiment is constructed by adding the managed object access object AO1 to the construction of the first embodiment in which the API supplied by the enhanced operational objects EO1 and EO2 is used for management requiring access to the managed object that can be written into the program S1. The AO1 allows to describe the API that directly accesses the managed object in the program S1, thus increasing the degree of freedom in writing the management script requiring access to the managed object.

The agent device 1 of the fourth embodiment of the present invention is described in detail referring to the drawings.

Figure 11:
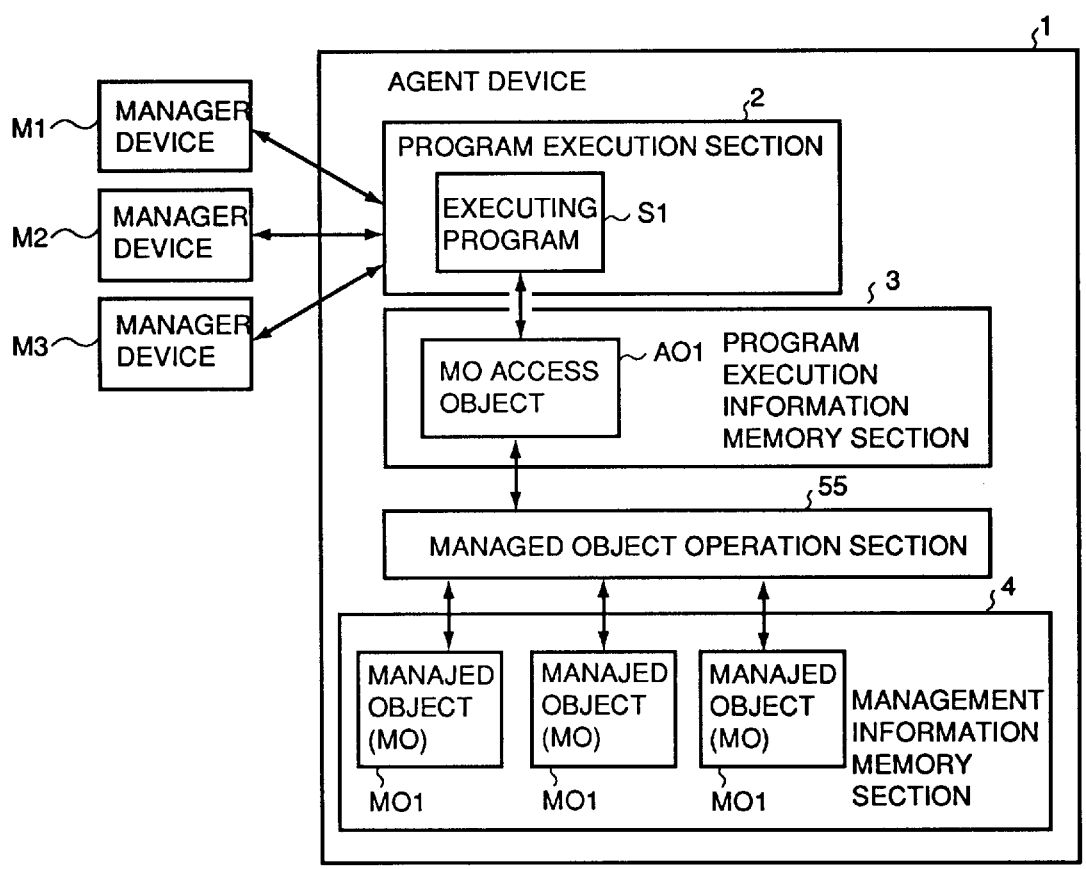
FIG. 11 is a block diagram showing a construction of an agent device with program reception function of a fourth embodiment of the present invention.

FIG. 11 is a block diagram representing the construction of the agent device of the fourth embodiment. The construction of the agent device 1 of the fourth embodiment is characterized by a managed object operation section 55 added to the agent device 1 of the third embodiment shown in FIG. 8.

The operation of the agent device 1 of the fourth embodiment is described referring to the drawings.

Figure 12:
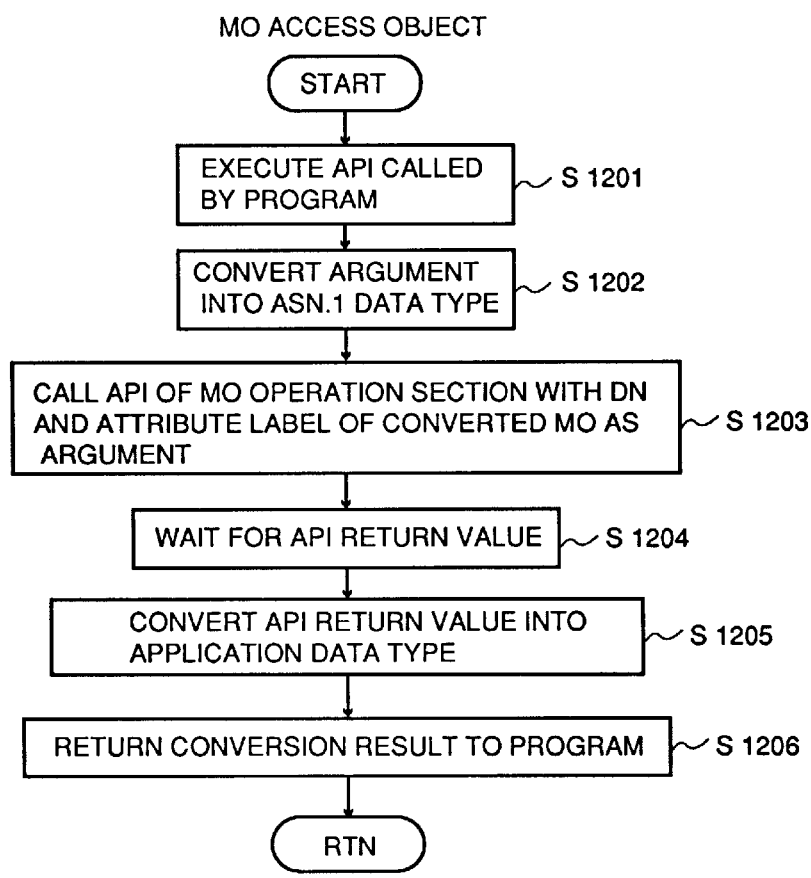
FIG. 12 is a flowchart representing operations of a managed object access object shown in FIG. 11.

The flowchart representing the operation of the managed object access object AO1 of the agent device 1 of the third embodiment is shown in FIG. 10. While the flowchart showing the operation of the managed object access object AO1 of the fourth embodiment is shown in FIG. 12. Additionally the operation of the managed object operation section 55 has been added. Therefore explanation of the flowchart representing the operation of the program execution section 2 shown in FIG. 9 is omitted.

The operation of the managed object access object AO1 of the fourth embodiment is described referring to the drawings.

FIG. 12 is a flowchart showing the operation of the managed object access object AO1 of the agent device 1 of the fourth embodiment.

It is assumed that the program S1 being executed calls the API supplied by the managed object access object AO1. The given argument is in the form of the DN and attribute label of the managed object intended for access written in application language data type. The managed object access object AO1 starts executing the API (step S1201). Then the managed object access object AO1 converts the DN and attribute label given as the argument into ASN.1data type realized with C or C++ that is actually accessible (step S1202) The conversion table stored in the program execution information memory section 3 can be used for the conversion. Then the managed object access object AO1 calls the API supplied by the managed object operation section 55 using the argument in the form of DN and attribute label of the managed object converted at step S1202 so as to access the target managed object (step S1203). The managed object access object AO1 waits until it receives the result from the called API (step S1204).

Figure 13:
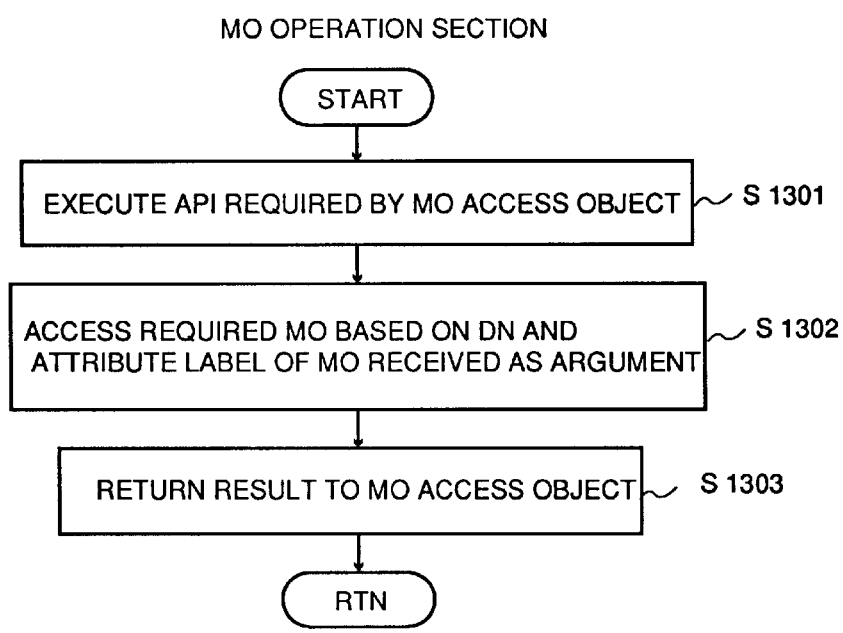
FIG. 13 is a flowchart representing operations of a managed object operation section shown in FIG. 11.

The managed object operation section 55 starts operating the process shown in FIG. 13.

The managed object operation section 55 starts executing the API required by the managed object access object AO1 (step S1301). The managed object operation section 55 accesses the required managed object based on the DN and attribute label received as the given argument (step S1302). The managed object operation section 55 returns the result to the managed object access object AO1 (step S1303).

The managed object access object AO1 converts the attribute information of the managed object returned from the API into the application language data type (step S1205). The data conversion table stored in the program execution information memory section 3 is used for the conversion. The managed object access object AO1 returns the attribute information of the converted managed object to the program S1 (step S1206).

The agent device 1 of the fourth embodiment provides the effect obtained from the second embodiment and the effect obtained from the third embodiment. That is, adding the managed object operation section 55 improves module capability and application range of the managed object access object AO1. The managed object access object AO1 further improves the degree of freedom in management description that can be written into the program S1.

The agent device 1 of the fifth embodiment of the present invention is described referring to the drawings.

Figure 14:
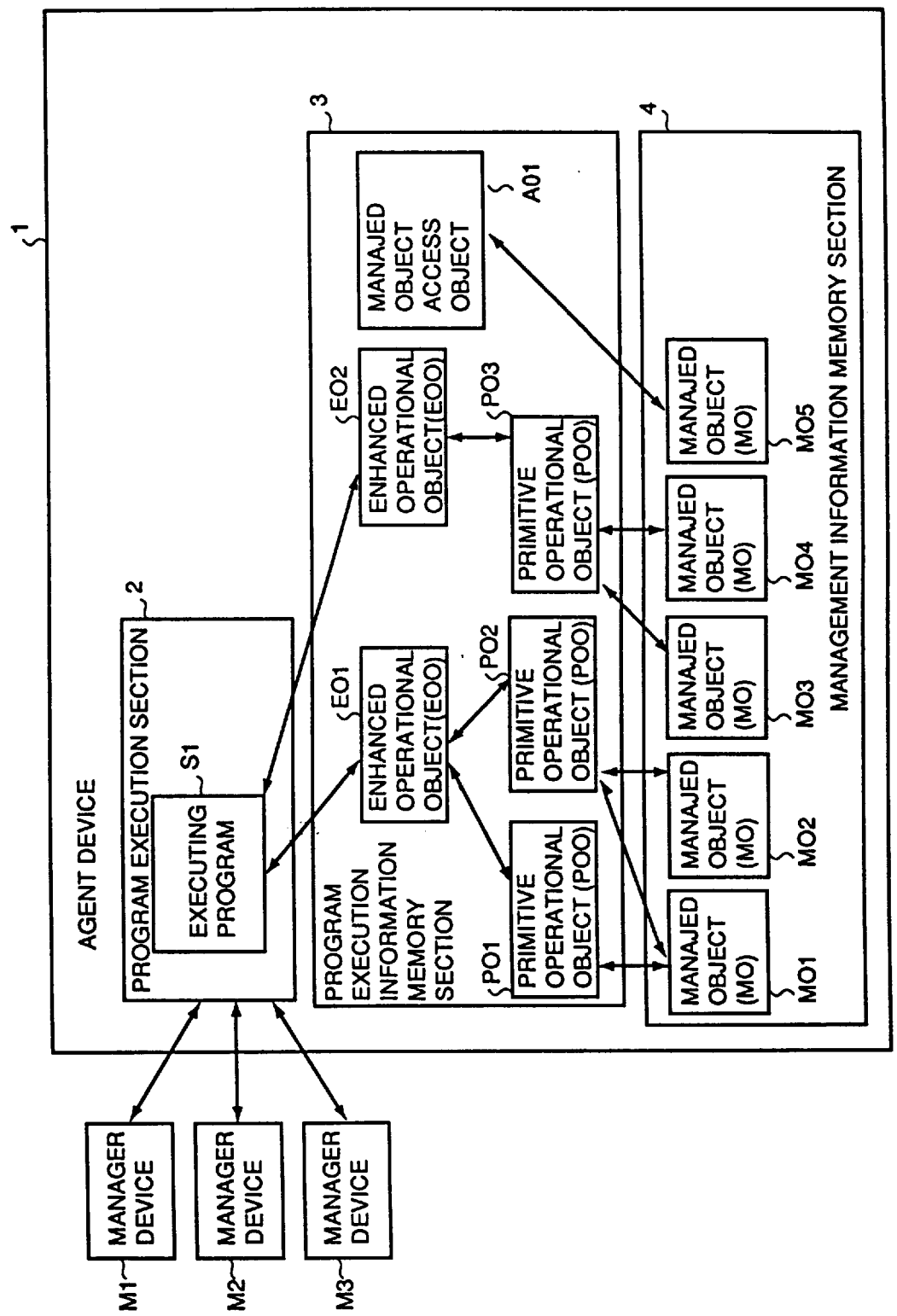
FIG. 14 is a block diagram showing a construction of an agent device with program reception function of a sixth embodiment of the present invention.

FIG. 14 is a block diagram representing a construction of the agent device 1 of the fifth embodiment. The construction of the agent device 1 of the fifth embodiment is characterized by adding the managed object access object AO1 of the agent device 1 of the third embodiment shown in FIG. 8 to the construction of the agent device 1 of the first embodiment shown in FIG. 1.

The operation of the above-constructed agent device 1 of the fifth embodiment is described referring to the drawings.

Figure 15:
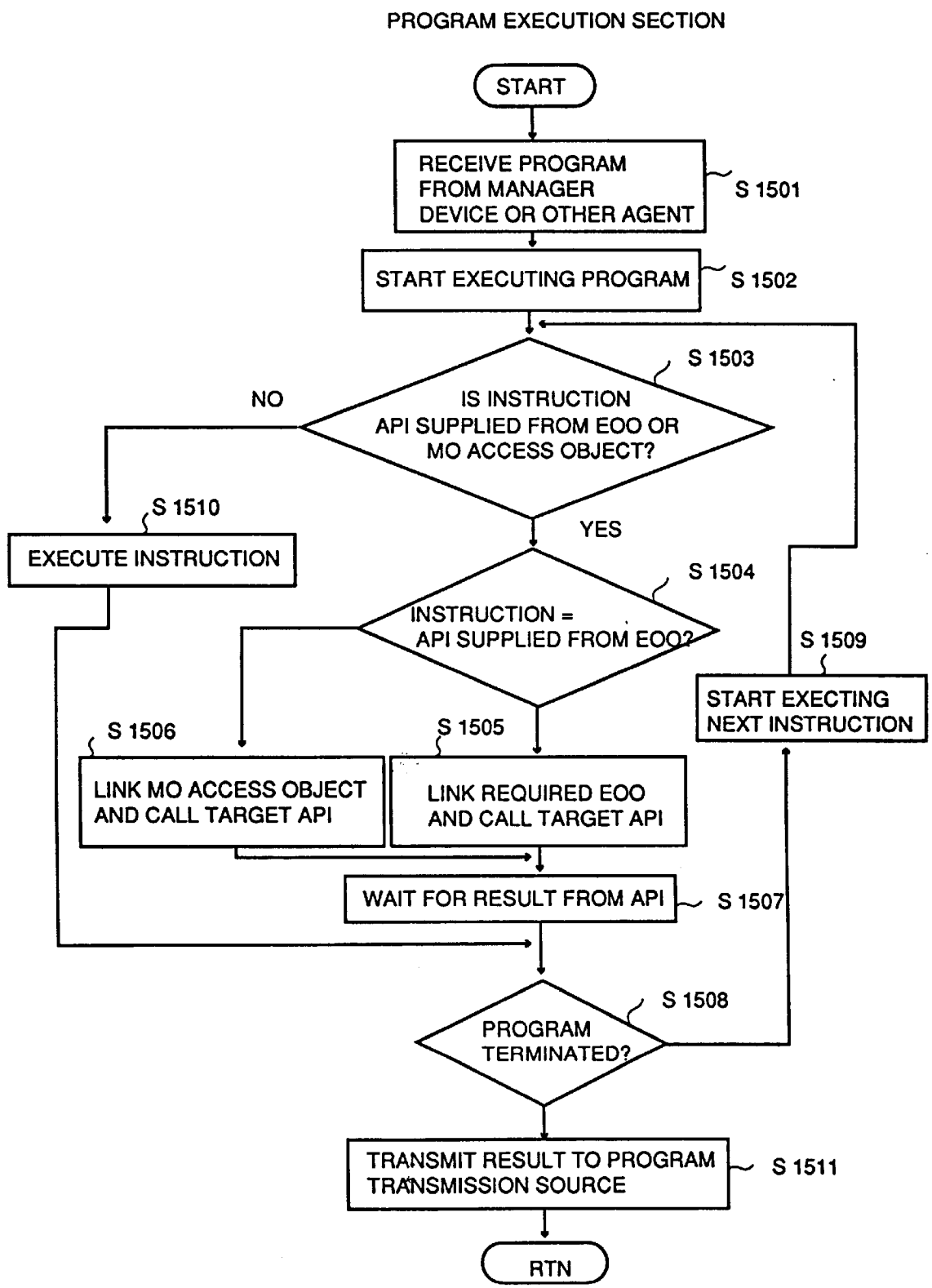
FIG. 15 is a flowchart representing a flow of operations executed by a program execution section shown in FIG. 14

The difference of the agent device 1 between the fifth embodiment and the first or the third embodiment is that the program execution section 2 of the fifth embodiment operates in the manner as shown in FIG. 15. Therefore explanations of FIG. 4 showing the flowchart representing operations of the enhanced operational objects EO1 and EO2 and FIG. 10 showing the flowchart representing operations of the primitive operational objects PO1, PO2 and PO3 are omitted.

For example, it is assumed that the program execution section 2 receives the program S1 from the manager device M1 (step S1501). The program execution section 2 starts executing the received program S1 (step S1502). The program execution section 2 checks if the instruction intended for execution is identical to the API supplied by the enhanced operational objects EO1, EO2 or the managed object access object AO1 (step S1503).

When the result at step S1503 shows that the instruction is identical to the API supplied by the enhanced operational objects EO1, EO2 or the managed object access object AO1, the program execution section 2 further checks if the instruction is identical to the API supplied by the enhanced operational objects EO1 and EO2 (step S1504).

When the result at step S1504 shows that the instruction is identical to the API supplied by the enhanced operational object, for example, EO1, the program execution section 2 links the enhanced operational object EO1 and calls the required API (step S1505). The argument given at this time is written as an abstract name. Subsequently the enhanced operational object EO1 executes the operation shown in the flowchart of FIG. 3.

When the result at step S1504 shows that the instruction is identical to the API supplied by the managed object access object AO1, the program execution section 2 links the managed object access object AO1 and calls the required API (step S1506). The argument given at this time is the DN and attribute label of the managed object written in the application language data type. Subsequently the managed object access object AO1 executes the operation shown in the flowchart of FIG. 10.

Then the program execution section 2 waits until the result is returned from the required API (step S1507).

When the result at step S1SO3 shows that the instruction intended for execution is not identical to the API supplied by the enhanced operational objects EO1 and EO2 or the managed object access objects AO1, the program execution section 2 starts executing the instruction (step S1510).

The program execution section 2 checks if the program S1 is terminated with the instruction executed at step S1507 or step S1510 (step S1508).

When the result at step S1508 shows that the program S1 is not terminated, the program execution section 2 starts executing the next instruction (step s1509).

When the result at step S1508 shows that the program S1 is terminated, the program execution section 2 transmits the result of executing the program S1 to the manager device M1 (step S1511).

The agent device 1 of the fifth embodiment provides the effect obtained from the agent device 1 of the first embodiment and the effect obtained from the agent device 1 of the third embodiment. The API supplied by the enhanced operational objects EO1 and EO2 allows for description of the program S1, thus further simplifying to script the program. The API supplied by the managed object access object AO1 allows for description of instruction to directly access the managed object, for example, MO1, thus improving the degree of freedom in the program description.

The agent device 1 of the sixth embodiment of the present invention is described in detail referring to the drawings.

Figure 16:
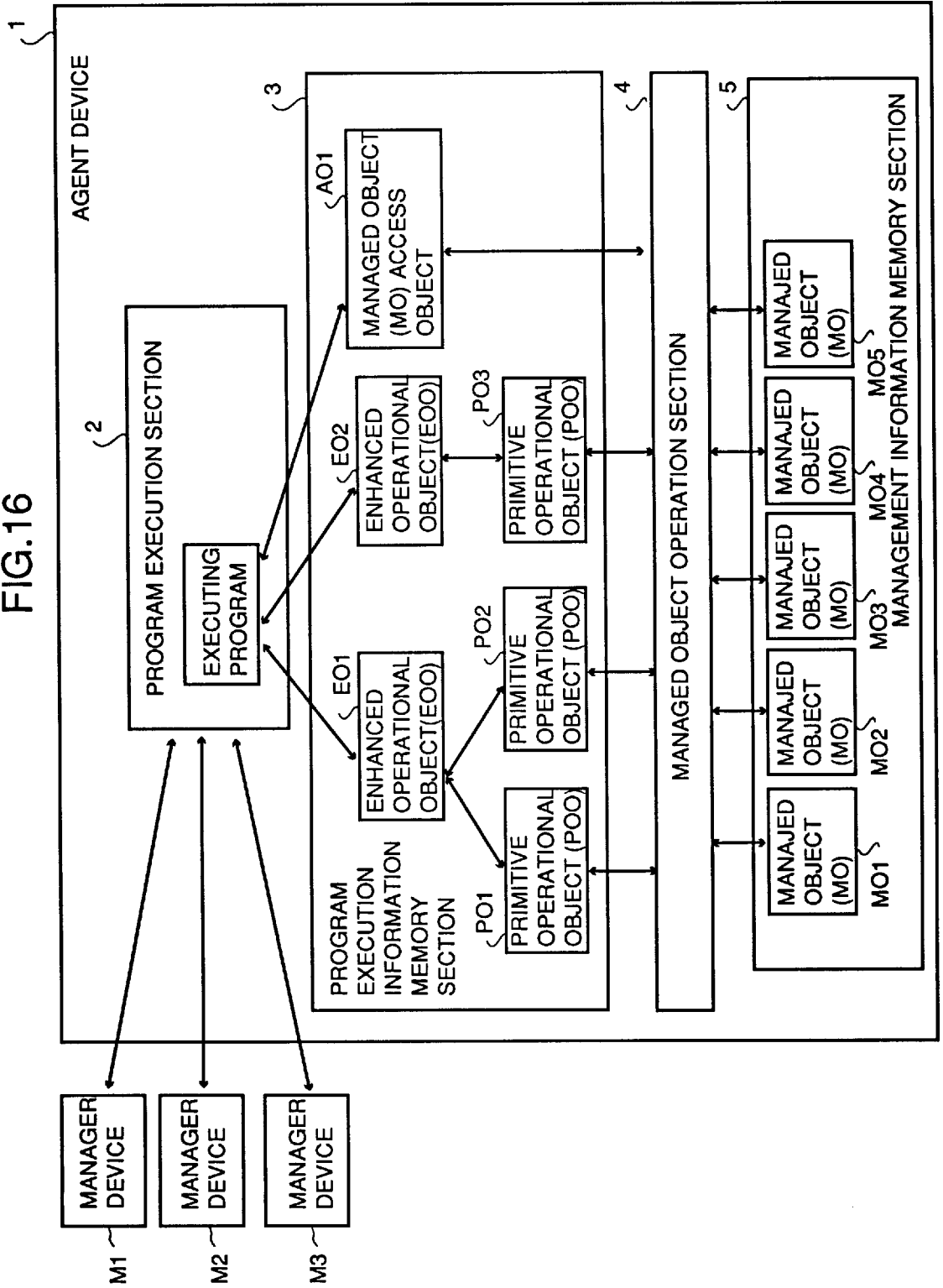
FIG. 16 is a managed object operation section.

FIG. 16 is a block diagram representing a construction of the agent device 1 of the sixth embodiment of the present invention. The construction of the agent device 1 of the sixth embodiment is characterized by the managed object operation section 55 added to the construction of the agent device 1 of the fifth embodiment shown in FIG. 14.

The operation of the above-constructed agent device 1 of the sixth embodiment is described referring to the drawings.

The sixth embodiment uses the primitive operational objects PO1, PO2 and PO3 of the agent device 1 of the second embodiment and the managed object access object AO1 of the agent device 1 of the fourth embodiment compared with the fifth embodiment. Therefore the explanation of FIG. 15 representing the flowchart of the operation of the program execution section 2, FIG. 2 representing the flowchart of the operation of the enhanced operational objects EO1 and EO2, FIG. 6 representing the flowchart of the operation of the primitive operational objects PO1, PO2, and PO3, and FIG. 12 representing the flowchart of the operation of the managed object access object AO1 are omitted.

Figure 17:
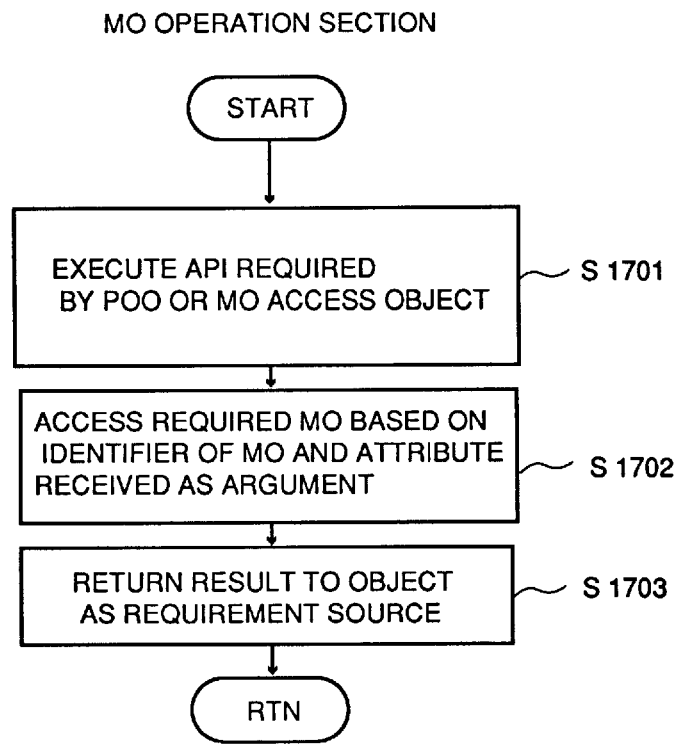
FIG. 17 is a flowchart representing a flow of operations executed by a managed object operation section shown in FIG. 16.

FIG. 17 is a flowchart representing operations of the managed object operation section 55 of the agent device 1 of the sixth embodiment. The operation of the managed object operation section 55 is described referring to this drawing.

It is assumed that the API supplied by the managed object operation section 55 is called by the primitive operational object or the managed object access object, for example, the primitive operational object PO1. Then the managed object operation section 55 starts executing the called API (step S1701). The managed object operation section 55 accesses the managed object represented by the DN and attribute label received as the argument, for example, the managed object MO1 (step S1702). Then the managed object operation section 55 returns the access result to the primitive operational object PO1.

The agent device 1 of the sixth embodiment provides the effect obtained from the agent device 1 of the fifth embodiment and the effect obtained from the agent device 1 of the second or the fourth embodiment. In addition to the simplified and improved degree of freedom in program description provided by the agent device of the fifth embodiment, the managed object operation section 55 further provides advanced module capability and increased application range of the primitive operational objects PO1, PO2 and PO3 and the managed object access object AO1.

The subsequent description relates to the path trace function under the condition where the agent device 1 with program reception function of the embodiment 1 to embodiment 6 is applied to the management function for network management.

The path tracing function realized by the agent device 1 with program reception function of the embodiment 1 to embodiment 6 is first described referring to the drawings.

Figure 18:
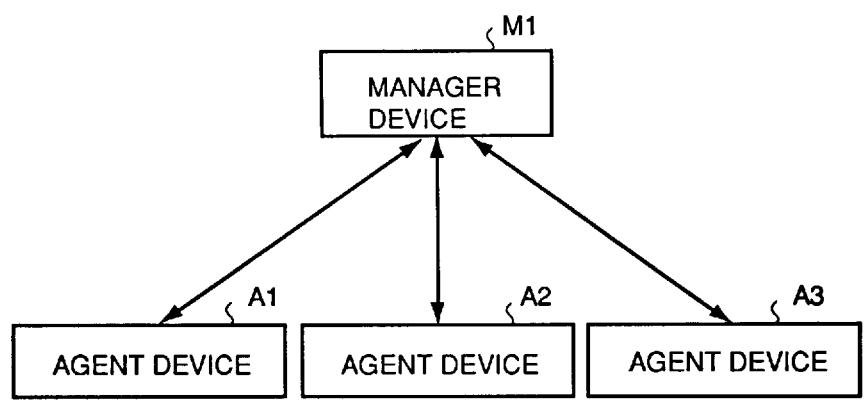
FIG. 18 shows a first example of a construction of a manager device and an agent device when a path trace function is realized using an agent device with program reception function of the first embodiment to the sixth embodiment.

FIG. 18 shows a first construction example for realizing the path tracing function using the agent device with program reception function of the embodiment 1 to the embodiment 6 (hereinafter simply referred to as the agent device ) A1, A2, A3 and the manager device M1. In this construction, the manager device M1 transmits the program containing a path trace request (path trace program) S1 to the agent devices A1, A2, A3 on the path intended for tracing. Each of the agent devices A1, A2, A3 executes the program S1 and returns the result to the manager device M1. The manager device collects and processes the respective results. FIG. 18 shows only one manager device M1 and three agent devices A1, A2 and A3. However plural manager devices M1 to Mk and plural agent devices A1 to Al (l: any integer) can be practically used.

The agent device A1 of the seventh embodiment of the present invention that realizes the above-structured path trace function is described in detail referring to the drawings.

Figure 19:
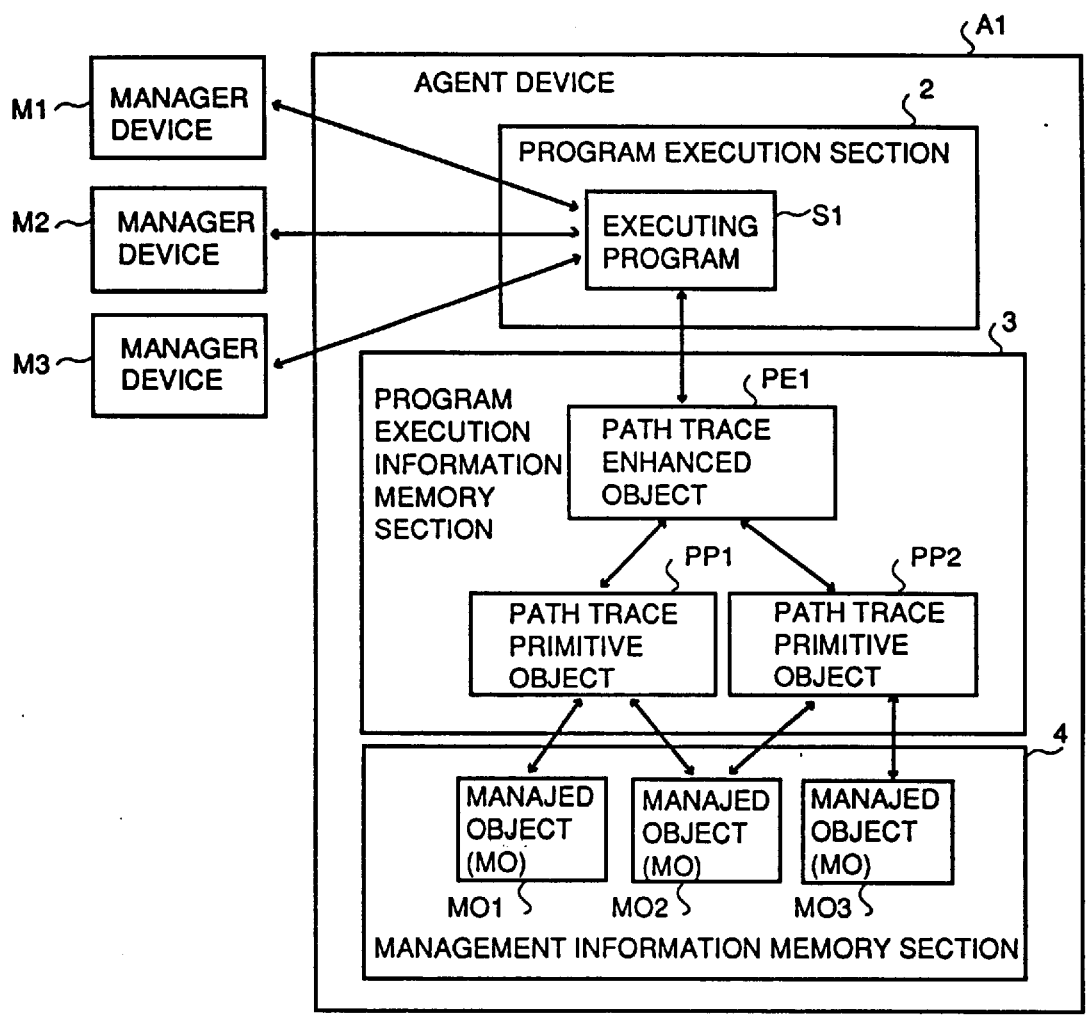
FIG. 19 is a block diagram showing a construction of an agent device with program reception function of the seventh embodiment of the present invention.

FIG. 19 is a block diagram representing a construction of the agent device A1 of the seventh embodiment. The major section of the agent device A1 of the seventh embodiment comprises a program execution section 2, program execution information memory section 3 and managed information memory section 4.

A path trace enhanced object PE1 is obtained by realizing the path trace function by the enhanced operational objects EO1 and EO2 of the agent device 1 of the first embodiment. In addition to functions of the enhanced operational objects EO1 and EO2 of the agent device 1 of the first embodiment, the path trace enhanced object PE1 provides the program S1 with various types of path trace function such as searching the other terminal point of the path already provided with one terminal point and detecting all path existing between two terminal points, detecting all devices relaying with respect to one path in the form of API.

Path trace primitive objects PP1 and PP2 correspond to the primitive operational objects PO1, PO2 and PO3 of the agent device 1 of the first embodiment, which provide the path trace enhanced object PE1 with the function of accessing the managed object required by the path trace enhanced object PE1, for example, MO1 in the form of API. The return value of the API supplied by the path trace primitive objects PP1 and PP2 contains path status ("terminated", "cross-connect") as well as attribute information of the accessed managed object. FIG. 19 shows only two path trace primitive objects PP1 and PP2. However plural path trace primitive objects PP1 to PPf (f is any integer) can be practically used.

Figure 20:
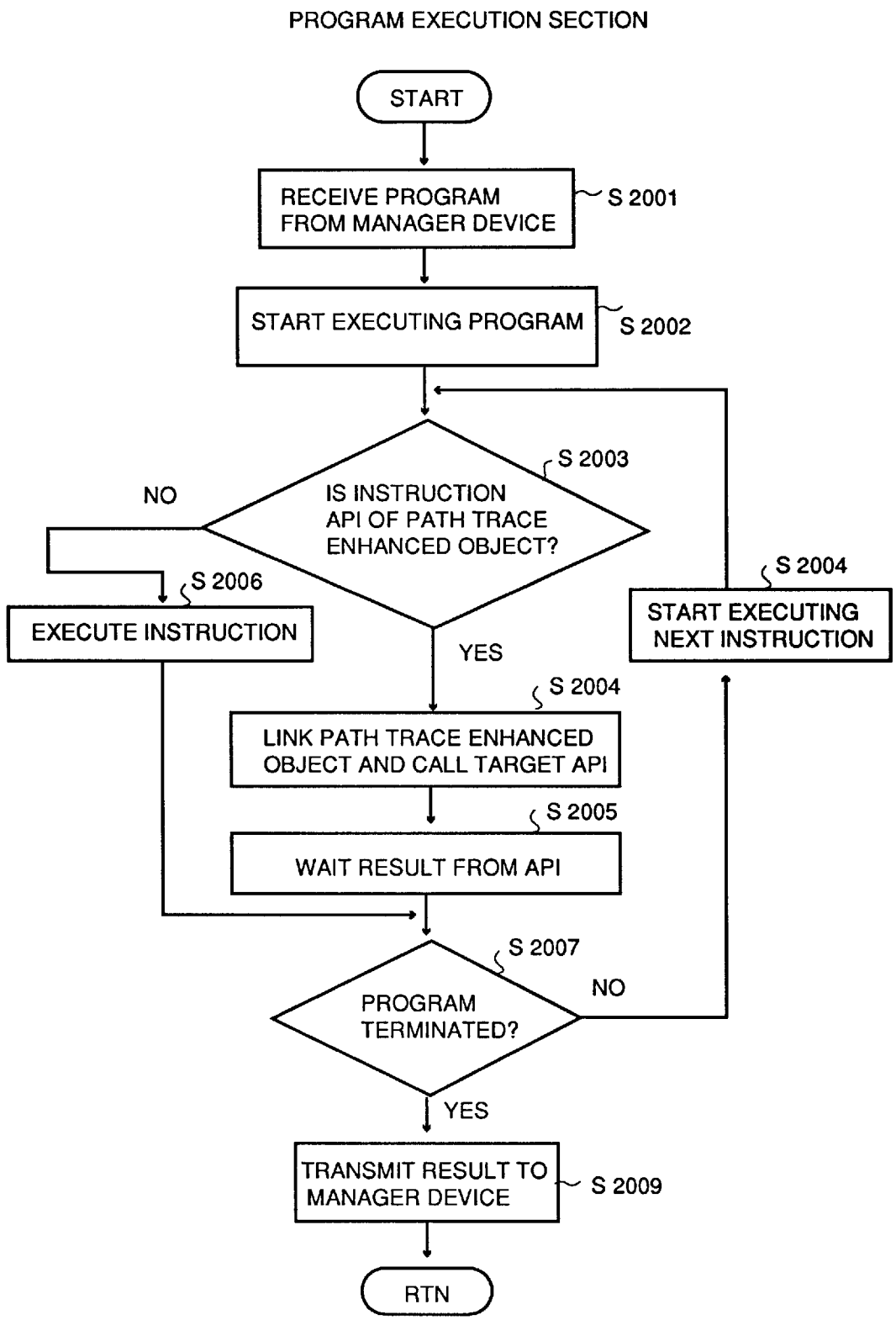
FIG. 20 is a flowchart representing a flow of operations executed by a program execution section shown in FIG. 19.
Figure 21:
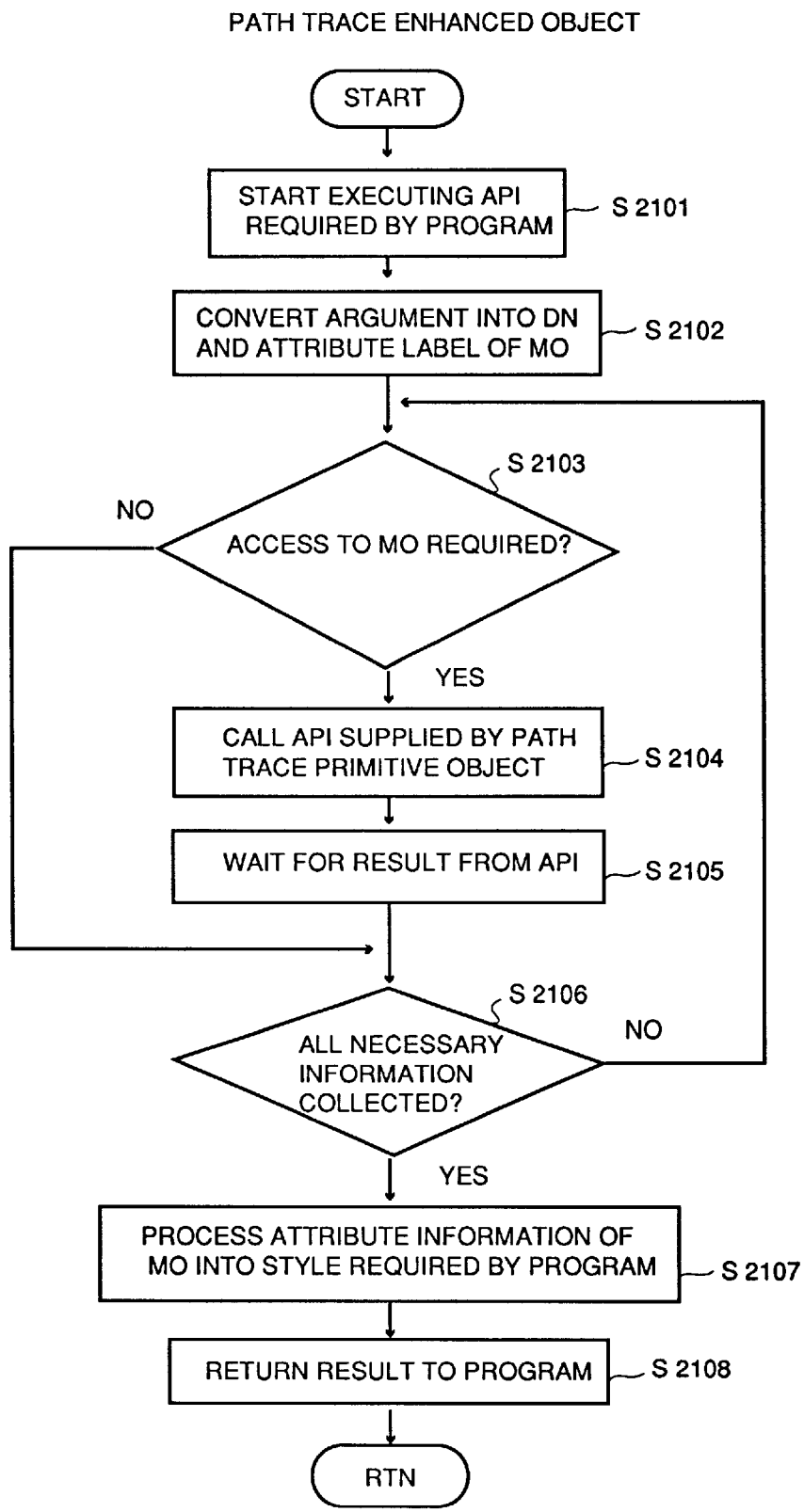
FIG. 21 is a flowchart representing operations of a path trace enhanced object shown in FIG. 19.
Figure 22:
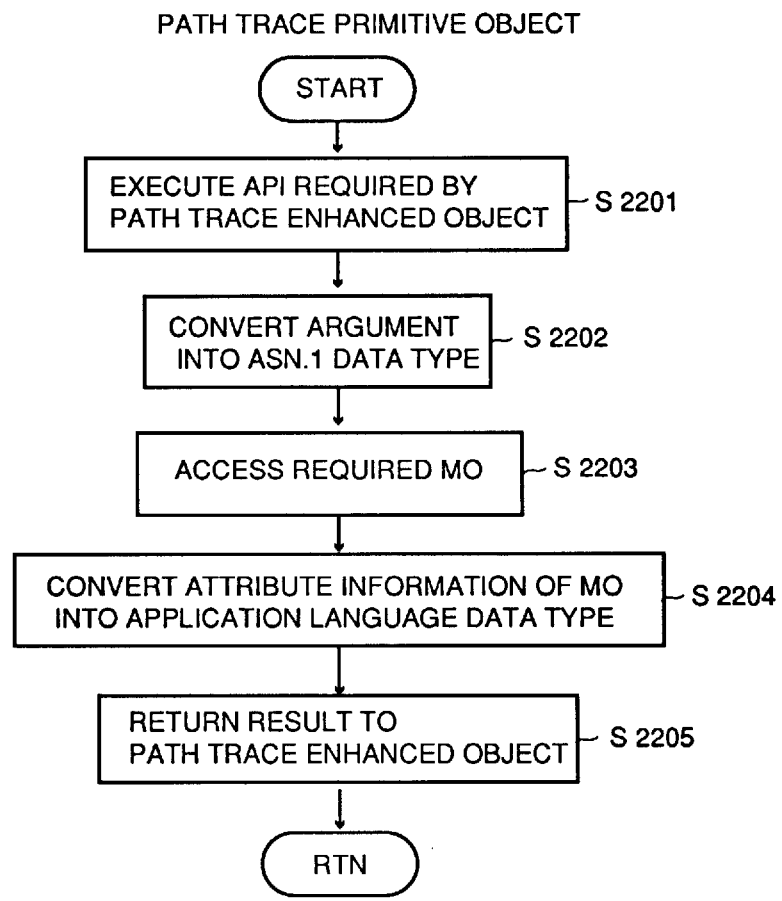
FIG. 22 is a flowchart representing operations of a path trace primitive object shown in FIG. 19.

FIGS. 20 to 22 represents flowcharts of processings executed by the program execution section 2, path trace enhanced object PE1 and path trace primitive objects PP1 and PP2, respectively.

The operation of the above-constructed agent device A1 of the seventh embodiment is described referring to the drawings.

FIG. 20 is a flowchart representing the flow of operations of the program execution section 2.

It is assumed that the program execution section 2 receives the program (path trace program) S1 containing path trace request given from, for example, the manager device M1 (step S2001). The program execution section 2 starts executing the received program S1 (step S2002). The program execution section 2 checks if the instruction intended for execution is identical to the API supplied by the path trace enhanced object PE1 (step S2003).

When the result at step S2003 shows that the instruction intended for execution is identical to the API supplied by the path trace enhanced object PE1, the program execution section 2 links the path trace enhanced object PE1 and calls the API for execution (step S2004). The argument given to the API at this time has an abstract name that indicates the path intended for tracing, for example, "pathA" or the device at a terminal point, for example, "node_A". The program execution section 2 waits until it receives the result from the API (step S2005).

The path trace enhanced object PE1 that supplies the required API starts executing the process shown in FIG. 21.

The path trace enhanced object PE1 starts executing the API required by the program S1 (step S2101). The path trace enhanced object PE1 converts the abstract name given as the argument into the DN and attribute label of the managed object written in application language data type (step S2102). The name conversion table stored in the program execution information memory section 3 is used for the conversion. Then the path trace enhanced object PE1 checks if it is required to access the managed object for executing the API (step S2103).

When the result at step S2103 shows that access to the managed object is required, the path trace enhanced object PE1 calls the API supplied by the path trace primitive object, for example, PP1 for accessing the managed object (step S2104). The argument given at this time is designated as the DN and attribute label of the managed object converted at step S2102. The path trace enhanced object PE1 waits until it receives the result from the API (step S2105).

The path trace primitive object PP1 that supplies the required API starts executing the process shown in FIG. 22.

The path trace primitive object PP1 starts executing the API required by the path trace enhanced object PE1 (step S2201). The path trace primitive object PPI converts the DN and attribute label of the managed object given as the argument into the ASN.1 data type that is actually accessible (step S2202). The data conversion table stored in the program execution information memory section 3 is used for the conversion. The path trace primitive object PP1 accesses the required managed object, for example, MO1 using the DN and attribute label of the managed object converted at step S2202 (step S2203). Subsequently the path trace primitive object PP1 converts the attribute information of the managed object obtained at step S2203 into the application language data type (step S2204). The data conversion table stored in the program execution information memory section 3 is used for the conversion. The path trace primitive object PP1 returns the conversion result to the path trace enhanced object PE1 as the request source (step S2205).

The subsequent operation of the path trace enhanced object PE1 is described below.

When the result at step S2103 shows that access to the managed object is not required or the result at step S2105 shows that the result is returned from the API supplied by the path trace primitive object PP1, the path trace enhanced object PE1 checks if all information for supplying the management function is collected (step S2106)

When the result at step S2106 shows that all the information is collected, the path trace enhanced object PE1 process the final result from the API into the style required by the program S1 using the information (step S2107). The process executed at this time contains such process of converting the path route into the abstract expression, for example, "node_A, node_B, . . . ". The name conversion table stored in the program execution information memory section 3 is used for the conversion. Then the path trace enhanced object PE1 returns the processed result to the program S1 (step S2108).

When the result at step S2106 shows that the required information is not collected yet, the path trace enhanced object PE1 repeats processing from step S2103.

The subsequent operation of the program execution section 2 is described below.

When the result at step S2003 shows that the instruction is not identical to the API supplied by the path trace enhanced object PE1, the program execution section 2 executes the instruction (step S2006).

The program execution section 2 checks if the program S1 is terminated with the instruction executed at step S2006 or step S2005 (step S2007).

When the result at step S2007 shows that the program S1 is not terminated, the program execution section 2 starts executing the next instruction (step S2008).

When the result at step S2007 shows that the program S1 is terminated, the program execution section 2 transmits the result to the manager device M1 (step S2009).

Figure 23:
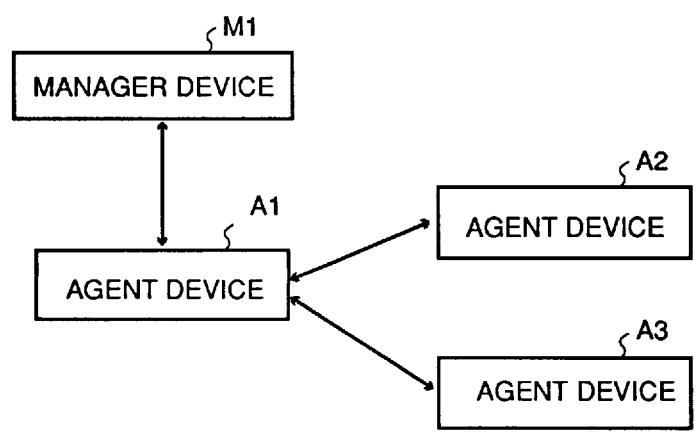
FIG. 23 shows a second example of a construction of a manager device and an agent device when a path trace function is realized using an agent device with program reception function of the first embodiment to the sixth embodiment.

FIG. 23 shows the second construction example for realizing the path trace function using the agent devices with program reception function A1, A2, A3 and the manager device M1 of the first or the sixth embodiment of the present invention. In the above-constructed example, the program containing the path trace request is transmitted to the agent device A1 at a path terminal point. The agent device A1 transmits the program for path trace assignment within the device to the agent devices A2 and A3 on the path, respectively. The respective results are collected and returned to the manager device M1 by the agent device A1. FIG. 23 only shows one manager device M1 and three agent devices A1, A2 and A3. However plural manager devices M1 to Mk and plural agent devices A1 to Al can be practically used.

The above-constructed agent device A1 of the eighth embodiment of the present invention for realizing the path trace function is described in detail.

The construction of the agent device A1 of the eighth embodiment is the same as that of the agent device A1 of the seventh embodiment. Therefore explanation of the construction of the agent device A1 of the eighth embodiment is omitted.

The path trace enhanced object PE1 has a function of communication with other agent device in addition to those provided to the path trace enhanced object PE1 of the agent device A1 of the seventh embodiment.

Figure 24:
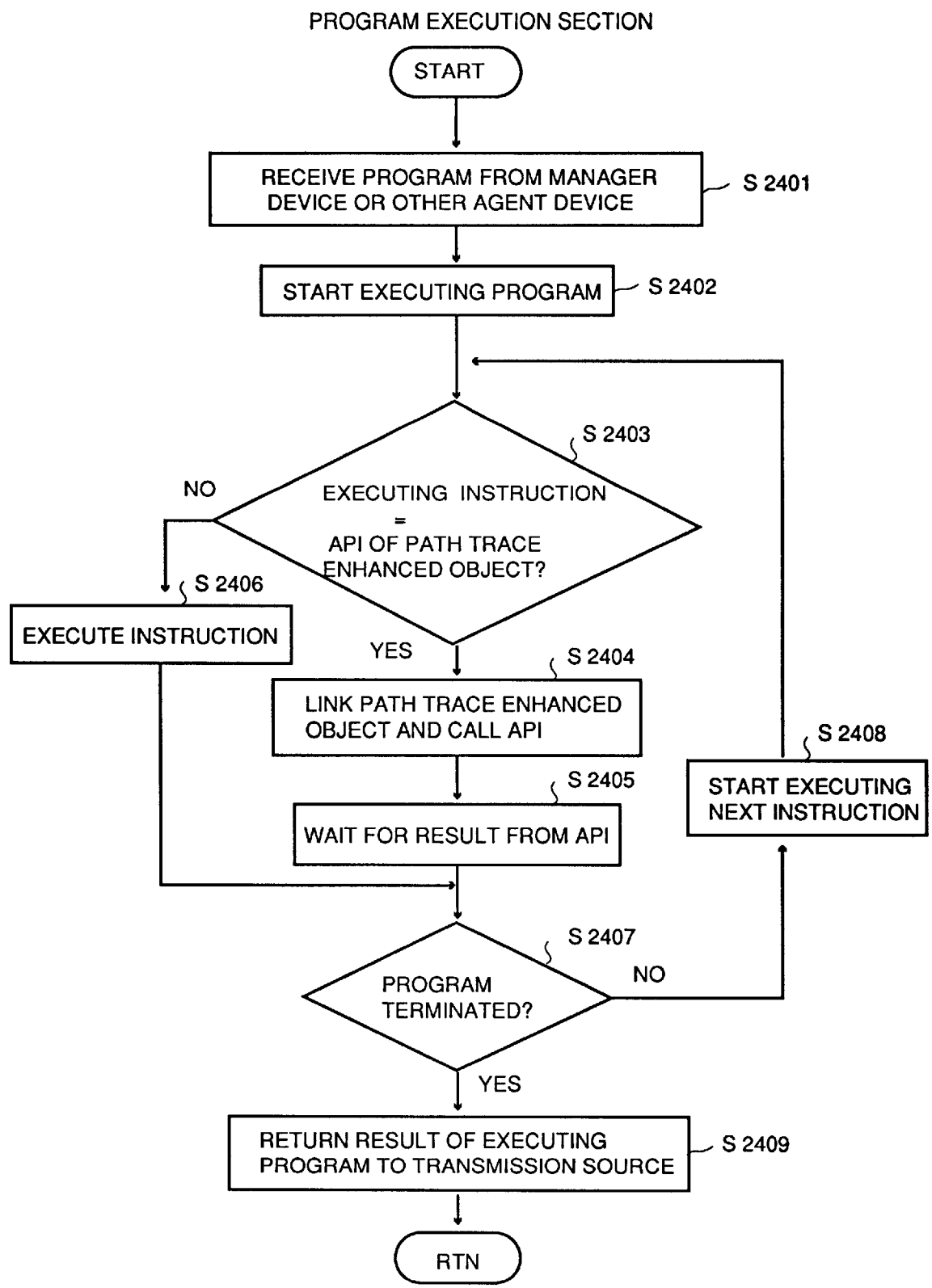
FIG. 24 is a flowchart representing a flow of operations executed by a program execution section of an agent device with program reception function of the eighth embodiment of the present invention.
Figure 25:
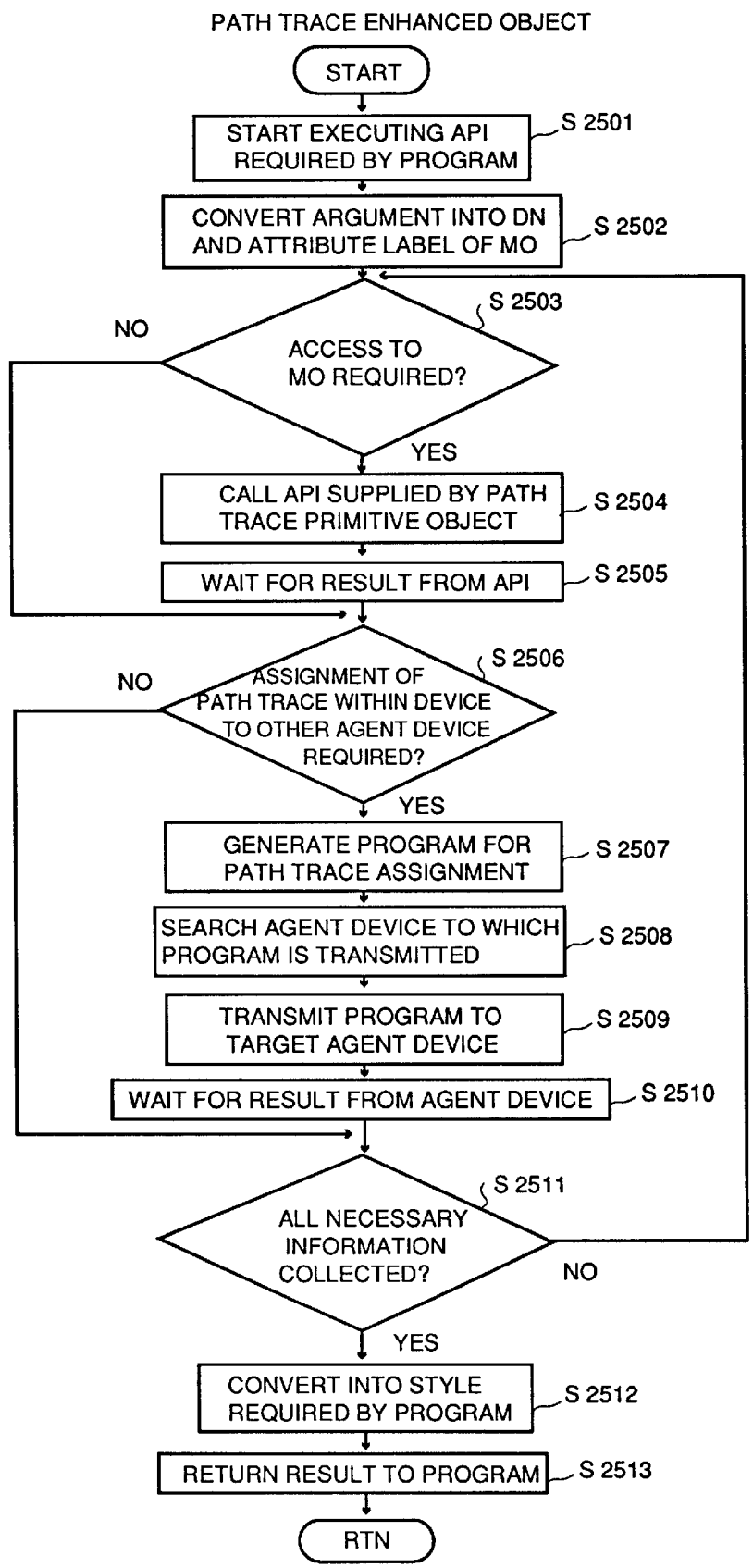
FIG. 25 is a flowchart representing a flow of operations of a path trace enhanced object of the agent device with program reception function of the eighth embodiment of the present invention.

FIGS. 24 and 25 are flowchart representing processings of the program execution section 2 and the path trace enhanced object PE1 of the agent device A1 of the eighth embodiment, respectively.

The operation of the above-constructed agent device A1 of the eighth embodiment is described referring to the drawing.

FIG. 24 is a flowchart representing the flow of operations executed by the program execution section 2.

It is assumed that the program execution section 2 receives the program S1 containing path trace request from the manager device or other agent device, for example, M1 (step S2401). The program execution section 2 starts executing the received program S1 (step S2402). The program execution section 2 checks if the instruction intended for execution is identical to the API supplied by the path trace enhanced object PE1 (step S2403).

When the result at step S2403 shows that the instruction is identical to the API supplied by the path trace enhanced object PE1, the program execution section 2 links the path trace enhanced object PE1 and call the target API for execution (step S2404). The argument given to the API has an abstract name indicating the path intended for tracing or the device at a terminal point. The program execution section 2 waits until it receives the result from the API (step S2405).

The path trace enhanced object PE1 that supplies the required API starts executing the process shown in FIG. 25.

The path trace enhanced object PE1 starts executing the API required by the program S1 (step S2501). The path trace enhanced object PE1 converts the abstract name given as the argument into the DN and attribute label of the managed object written in the application language data type (step S2502). The name conversion table stored in the program execution information memory section 3 is used for the conversion. The path trace enhanced object PE1 checks if the access to the managed object is required for executing the API (step S2503).

When the result at step S2503 shows that the access to the managed object is required, the path trace enhanced object PE1 calls the API supplied by the path trace primitive object, for example, PP1 for accessing the managed object (step S2504). The argument used at this time is formed as the DN and attribute label of the managed object converted at step S2502. The path trace enhanced object PE1 waits until it receives the result from the API (step S2505).

The path trace primitive object PP1 that supplies the required API executes processing in the same manner as the path trace primitive object PP1 of the agent device A1 of the seventh embodiment shown in FIG. 22.

The subsequent operation of the path trace enhanced object PE1 is described below.

When the result at step S2503 shows that access to the managed object is not required, or the result at step S2505 shows that the API supplied by the path trace primitive object PP1 returns the result, the path trace enhanced object PE1 checks if the path trace assignment within the device to other agent device is required (step S2506).

When the result at step 2506 shows that the path trace assignment within the device to other agent device is required, the path trace enhanced object PE1 generates the program for the path trace assignment (step S2507). The program generated at step S2507 is obtained by adding information such as the DN and attribute label of the managed object intended for accessing, identifier of the agent device as the transmission source or the like to the template of the program preliminarily stored in the program execution information memory section 3. The path trace enhanced object PE1 searches the agent device to which the program generated at step S2507 is transmitted (step S2508). Such transmission is done by searching the network structure information preliminarily stored in the program execution information memory section 3. In response to the result at step S2508, the path trace enhanced object PE1 transmits the program generated at step S2507 to the searched agent device (step S2509). Then the path trace enhanced object PE1 waits until it receives the program execution result from the agent device (step S2510).

When the result at step S2506 shows that no path trace assignment within the device to other agent device is required, or the result at step S2510 shows that the program execution result is transmitted from the agent device that has been assigned to execute path tracing within the device, the path trace enhanced object PE1 checks if all information for the agent device A1 to supply the path trace function is collected (step S2511).

When the result at step S2511 shows that all the necessary information is collected, the path trace enhanced object PE1 processes the collected information into the style required by the program (step S2512). This process includes the process to convert the path route into the abstract expression such as "node_A, node_B, ...". The name conversion table stored in the program execution information memory section 3 is used for the conversion process. Then the path trace enhanced object PE1 returns the processed result to the program S1 (step S2513).

When the result at step S2511 shows that all the necessary information is not collected yet, the path trace enhanced object PE1 repeats processing from step S2503.

The subsequent operation of the program execution section 2 is described below.

When the result at step S2403 shows that the instruction intended for execution is not identical to the API supplied by the path trace enhanced object PE1, or the result at step S2405 shows that the result is returned from the API supplied by the path trace enhanced object PE1, the program execution section 2 checks if the program S1 is terminated with the instruction executed either at step S2406 or step S2405 (step S2407).

When the step S2407 shows that the program S1 is terminated, the program execution section 2 returns the execution result of the program S1 to the manager device M1 as the request source (step S2409).

When the result at step S2407 shows that the program S1 is not terminated, the program execution section 2 starts executing the next instruction (step S2408).

Figure 26:
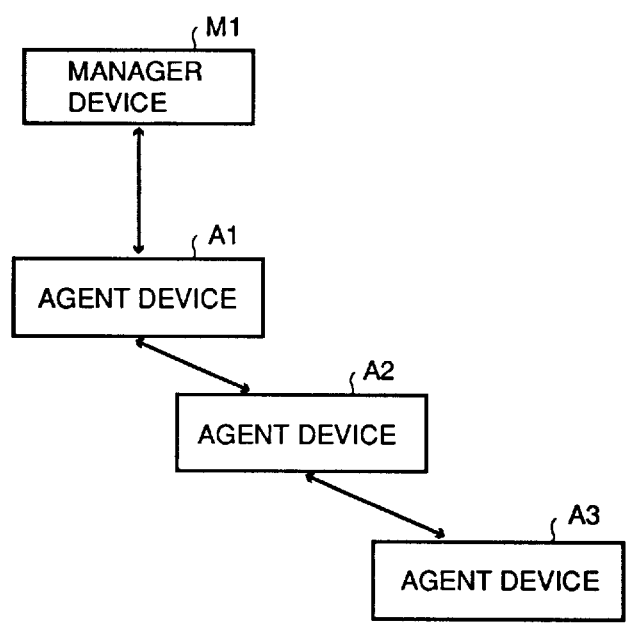
FIG. 26 shows a third example of a construction of a manager device and an agent device when a path trace function is realized using an agent device with program reception function of the first embodiment to the sixth embodiment.

FIG. 26 shows a third construction example for realizing the path tracing function using the agent devices with program reception function A1, A2, A3 of the first embodiment to the sixth embodiment and the manager device M1. In this construction, the program containing a path trace request is transmitted to the agent device A1 at a path terminal point. The agent device A1 receiving the program transmits the program containing the path trace request to the next agent device A2. The agent device A2 receiving the program transmits the program containing the path trace request to the next agent device A3. The agent device A3 at the other terminal point of the path transmits the trace result to the agent device A2 as the request source. Upon receiving the result, the agent device A2 adds the result of tracing executed by its present device to the result transmitted by the agent device A3 and then the combined result is transmitted to the agent device A1. The agent device A1 at a path starting point transmits the result passed through all agent devices on the path to the manager device M1. FIG. 26 only shows one manager device M1 and three agent devices A1, A2, A3. However plural manager devices M1 to Mk and plural agent devices A1 to Al can be practically used.

The agent device A1 of the above-described ninth embodiment of the present invention for realizing the path trace function is described in detail referring to the drawings.

The construction of the agent device A1 of the ninth embodiment is the same as that of the agent device A1 of the seventh or the eighth embodiment shown in FIG. 19. Therefore explanation of the construction is omitted. The program execution information memory section 3 of the agent device A1 of the ninth embodiment stores the connection information of each physical link compared with that of the agent device A1 of the eighth embodiment that stores the network structure information. The connection information of the physical links contains identifiers of the respective physical links, devices at both ends and agent devices that manage the respective devices.

The operation of the agent device A1 of the above-constructed ninth embodiment is described referring to the drawings.

Figure 27:
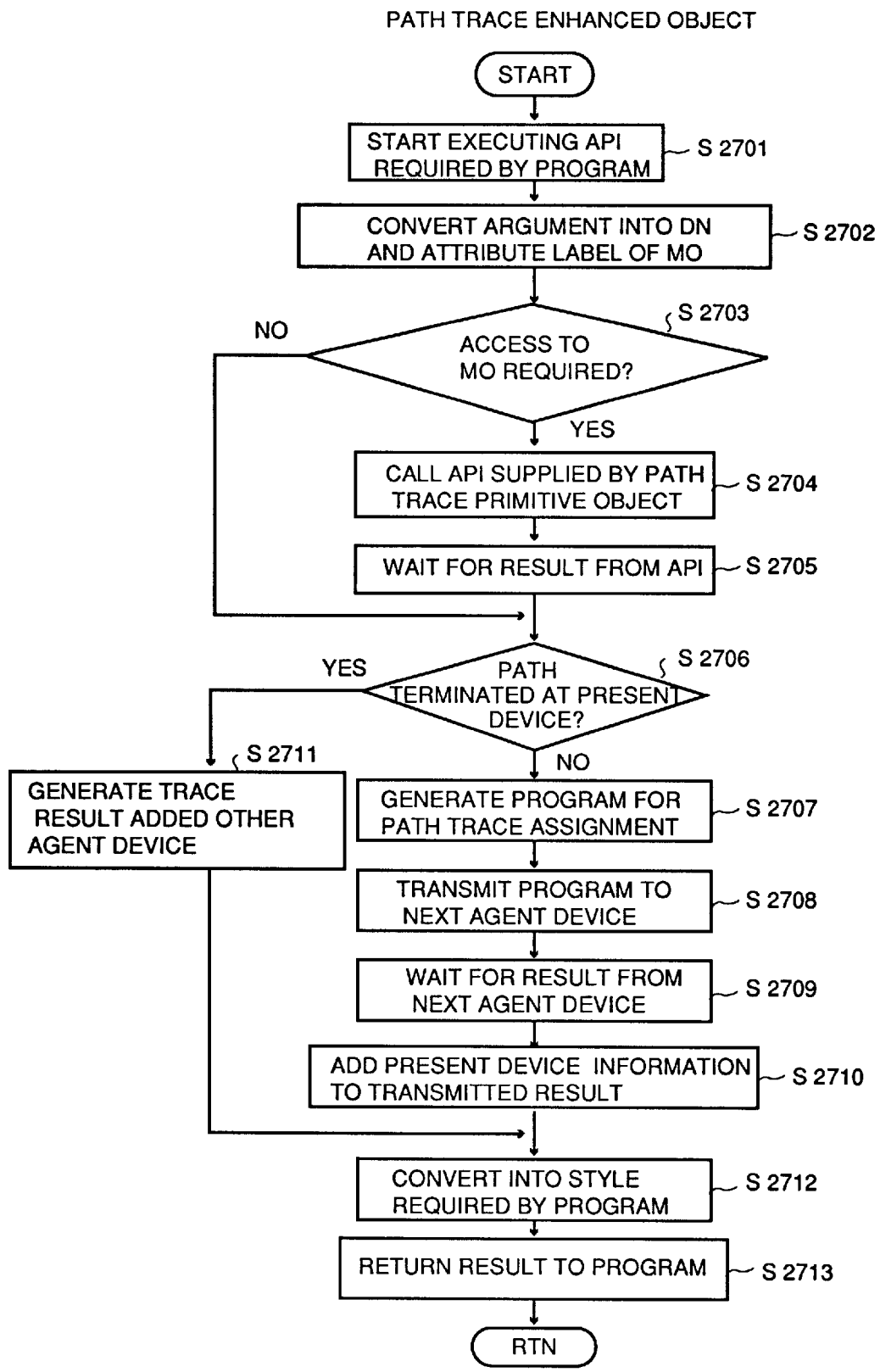
FIG. 27 is a flowchart representing a flow of operations of a path trace enhanced object of an agent device of a ninth embodiment of the present invention.

The difference of the operation of the agent device A1 between the ninth embodiment and the eighth embodiment is that operations of the path trace enhanced object PE1 of the ninth embodiment are represented by the flowchart shown in FIG. 27 compared with the operations of that of the eighth embodiment represented by the flowchart shown in FIG. 26. Therefore explanations of the flowchart showing the operation of the program execution section 2 of FIG. 24 and the flowchart showing the operations of the path trace primitive objects PP1 and PP2 of FIG. 22 are omitted.

It is assumed that the API supplied by the path trace enhanced object PE1 is called by the program S1 being executed. The subsequent process of the path trace enhanced object PE1 is described below.

The path trace enhanced object PE1 starts executing the API required by the program S1 (step S2701). The path trace enhanced object PE1 converts the abstract name given as the argument into the DN and attribute label of the managed object written in the application language data type (step S2702). The name conversion table stored in the program execution information memory section 3 is used for the conversion. The path trace enhanced object PE1 checks if the access to the managed object is required for obtaining the path trace information (step S2703).

When the result at step S2703 shows that the access to the managed object is required, the path trace enhanced object PE1 calls the API supplied by the path trace primitive object, for example, PP1 for accessing the managed object (step S2704). The argument given at this time is formed as the DN and attribute label of the managed object converted at step S2702. The path trace enhanced object PE1 waits until it receives the result from the API (step S2705).

The path trace primitive object PP1 called by the path trace enhanced object PE1 executes the process shown in FIG. 22.

The process of the path trace enhanced object PE1 after the result is returned from the API supplied by the path trace primitive object PP1 is described below.

When the result at step S2703 shows that the access to the managed object is not required, or the result at step S2705 shows that the result is returned from the called API, the path trace enhanced object PE1 checks if the present device is at a path terminal point (step S2706). This process is executed by referring to the return value of the API supplied by the path trace primitive object PP1 for judgment.

When the result at step S2706 shows that the present device is not at the terminal point, the path trace enhanced object PE1 generates the program for path trace assignment to the next agent device (step S2707). The program generated at step S2707 is obtained by adding the information such as the DN and attribute label of the managed object intended for access and the identifier of the agent device as the transmission source to the program template preliminarily stored in the program execution information memory section 3. The path trace enhanced object PE1 transmits the program generated at step S2707 to the next agent device (step S2708). The agent device to which the program is transmitted is determined by searching the connection information of the physical link stored in the program execution information memory section 3. The path trace enhanced object PE1 waits until it receives the result from the agent device (step S2709). In response to the result at step S2709, the path trace enhanced object PE1 adds the information of its present device to the trace information of the obtained path (step S2710).

When the result at step S2706 shows that the present device is at a terminal point, the path trace enhanced object PE1 generates the first trace result to which other results are sequentially added by other agent devices (step S2711).

The path trace enhanced object PE1 processes the attribute information of the managed object written in the application language data type obtained at step S2710 or step S2711 into the style required by the program S1 (step S2712). This process includes the process for converting the path route into the abstract expression such as "node__A, node__B, . . . ". The name conversion table stored in the program execution information memory section 3 is used for the conversion. Then the path trace enhanced object PE1 returns the processed result to the program S1 (step S2713).

Figure 28:
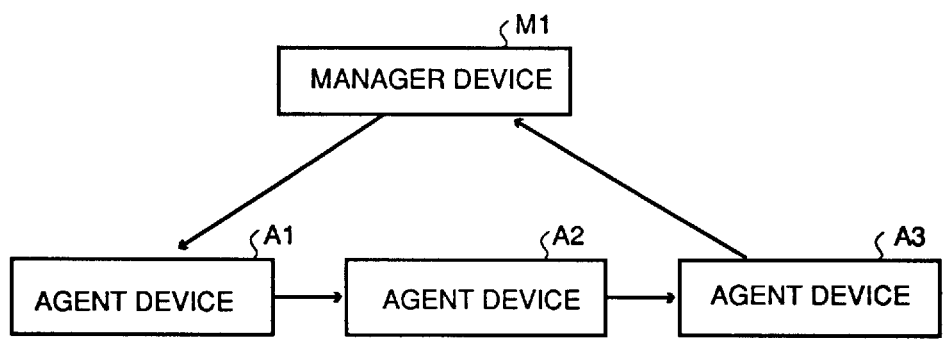
FIG. 28 shows a fourth example of a construction of a manager device and an agent device when a path trace function is realized using an agent device with program reception function of the first embodiment to the sixth embodiment.

FIG. 28 shows a fourth construction example for realizing the path tracing function using the agent devices with program reception function A1, A2, A3 of the first embodiment to the sixth embodiment and the manager device M1. In this construction, the program S1 containing a path trace request is transmitted to the agent device A1 at a path terminal point. The agent device A1 receiving the program S1 transmits the program containing the path trace request and the trace result of its present device to the next agent device A2. The agent device A2 receiving the program S1 likewise transmits the program containing the path trace request and the respective trace results to the next agent device A3. The agent device A3 at the other path terminal point adds the trace result of its present device to the sequentially transmitted trace results that will be returned to the manager device M1. FIG. 28 shows only one manager device M1 and three agent devices A1, A2, A3. However plural manager devices M1 to Mk and plural agent devices A1 to Al can be practically used.

The agent device A1 of the above-described tenth embodiment of the present invention for realizing the path trace function is described in detail referring to the drawings.

The construction of the agent device A1 of the tenth embodiment is the same as that of the agent device A1 of the seventh embodiment to the ninth embodiment. Therefore the explanation of the construction of the agent device A1 of the tenth embodiment shown in FIG. 19 is omitted.

The operation of the agent device A1 of the above-constructed tenth embodiment is described referring to the drawings.

Figure 29:
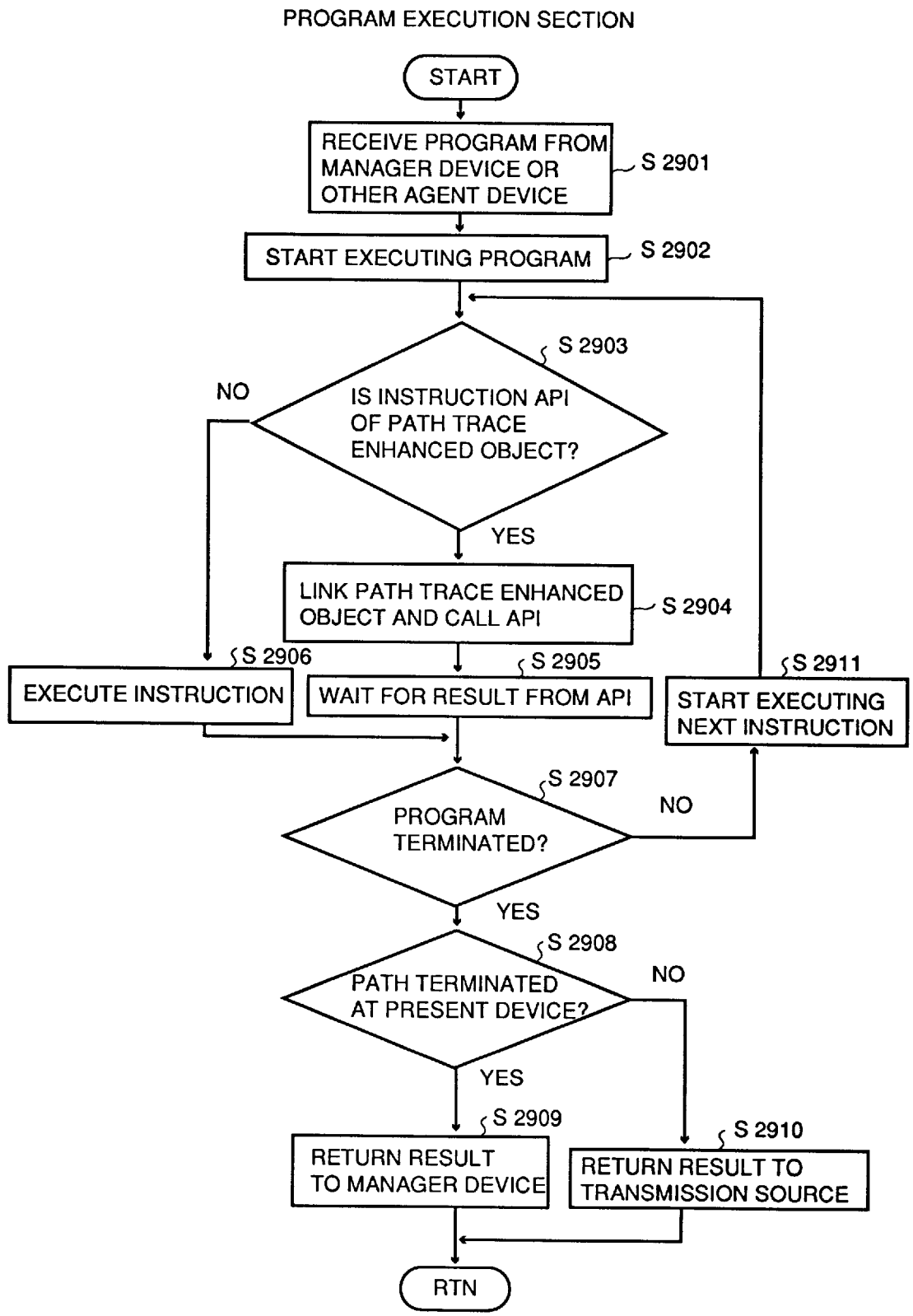
FIG. 29 is a flowchart representing a flow of operations executed by a program execution section of an agent device of a tenth embodiment of the present invention.
Figure 30:
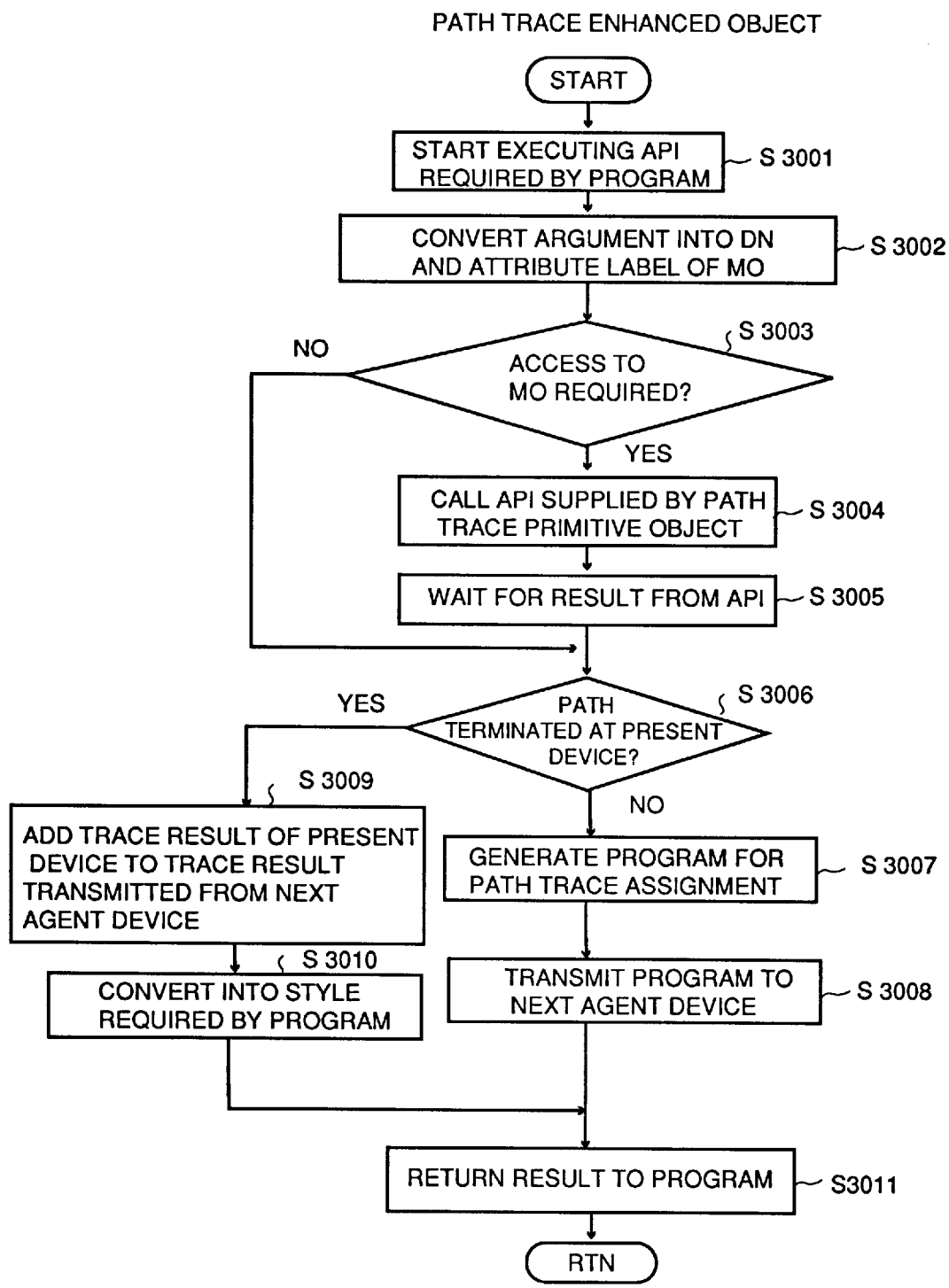
FIG. 30 is a flowchart representing a flow of operations of a path trace enhanced object of the agent device of the tenth embodiment of the present invention.

The difference of the operation of the agent device A1 between the tenth embodiment and the ninth embodiment is that the operation of the program execution section 2 of the agent device A1 of the tenth embodiment is shown by the flowchart of FIG. 29 and the operation of the path trace enhanced object PE1 is shown by the flowchart of FIG. 30 compared with those of the ninth embodiment shown by FIGS. 24 and 27, respectively. Therefore the explanation of the flowchart representing the operation of the path trace primitive objects PP1 and PP2 shown in FIG. 22 is omitted.

It is assumed that the program execution section 2 receives the program S1 containing the path trace request from the manager device M1 (step S2901). The program execution section 2 starts executing the received program S1 (step S2902). The program execution section 2 checks if the instruction intended for execution is identical to the API supplied by the path trace enhanced object PE1 (step S2903).

When the result at step S2903 shows that the instruction is identical to the API supplied by the path trace enhanced object PE1, the program execution section 2 links the path trace enhanced object PE1 and calls the API (step S2904). The argument given to the API has an abstract name indicating the path for tracing or the device at a terminal point. The program execution section 2 waits until it receives the result from the API (step S2905).

The path trace enhanced object PE1 that supplies the API starts executing the process shown in FIG. 30.

The path trace enhanced object PE1 starts executing the API required by the program S1 (step S3001). The path trace enhanced object PE1 converts the abstract name given as the argument into the DN and attribute label of the managed object written in the application language data type (step S3002). The name conversion table stored in the program execution information memory section 3 is used for the conversion. The path trace enhanced object PE1 checks if the access to the managed object is required for path tracing within the device (step S3003).

When the result at step S3003 shows that the access to the managed object is required, the path trace enhanced object PE1 calls the API supplied by the path trace primitive object, for example, PP1 (step S3004). The argument given at this time is formed as the DN and attribute label of the managed object converted at step S3002. The path trace enhanced object PE1 waits until it receives the result from the API (step S3005).

The path trace primitive object PP1 executes the process shown in FIG. 22.

The subsequent operation of the path trace enhanced object PE1 is described below.

When the result at step S3003 shows that the access to the managed object is not required, or the result at step S3005 shows that the result is returned from the API supplied by the path trace primitive object PP1, the path trace enhanced object PE1 checks if the present device is at the path terminal point (step S3006). This process is executed by referring to the value returned from the API supplied by the path trace primitive object PP1.

When the result at step S3006 shows that the present device is not at the path terminal point, the path trace enhanced object PE1 generates the program for path trace assignment to the next agent device (step S3007). The program generated at step S3007 is obtained by adding the information of the DN and attribute label of the managed object intended for access to the program template preliminarily stored in the program execution information memory section 3. The path trace enhanced objet PE1 transmits the program to the next agent device (step S3008). The next agent device to which the program is transmitted is determined by searching the connection information of the physical links stored in the program execution information memory section 3.

When the result at step S3006 shows that the present device is at the path terminal point, the path trace enhanced object PE1 adds the trace result of the present device to the path trace result transmitted from the next agent device (step S3009). Then the path trace enhanced object PE1 processes the trace result obtained at step S3009 into the style required by the program (step S3010). This process includes the process for converting the path route into the abstract expression such as "node_A, node_B, . . . ". The name conversion table stored in the program execution information memory section 3 is used for the conversion.

The path trace enhanced object PE1 returns the result of program transmission at step S3008 or the trace result processed at step S3010 to the program S1 (step S3011).

The subsequent operation of the program execution section 2 is described below.

When the result at step S2903 shows that the instruction intended for execution is not identical to the API supplied by the path trace enhanced object PE1, the program execution section 2 executes the instruction (step S2906). The program execution section 2 checks if the program S1 is terminated with the instruction executed at step S2905 or step S2906 (step S2907).

When the result at step S2907 shows that the program S1 is not terminated, the program execution section 2 starts executing the next instruction (step S2911).

When the result at step S2907 shows that the program S1 is terminated, the program execution section 2 further checks if the traced path is terminated at the present device (step S2908).

When the result at step S2908 shows that the traced path is terminated at the present device, the program execution section 2 returns the path trace result to the manager device M1 (step S2909).

When the result at step S2908 shows that the traced path is not terminated at the present device, the program execution section 2 returns the execution result of the program S1 to the manager device M1 as the source for transmitting the program S1 (step S2910).

Figure 31:
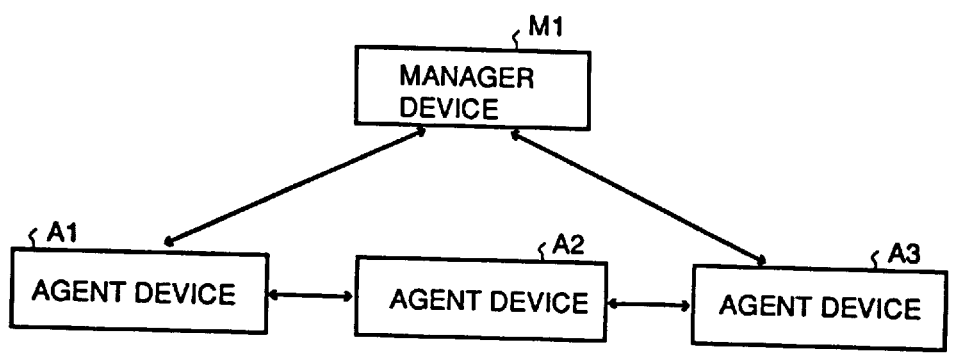
FIG. 31 shows a fifth example of a construction of a manager device and an agent device when a path trace function is realized using an agent device with program reception function of the first embodiment to the sixth embodiment.

FIG. 31 shows a fifth construction example for realizing the path trace function using the agent devices with program reception function A1, A2, A3 of the first embodiment to the sixth embodiment and the manager device M1. This example is obtained by combining the third construction example and the fourth construction example. When the path trace result is required to be transmitted to the manager device M1, the fourth construction example is used. When the path trace result is required to be transmitted to the agent device A1 that has received the program from the manager device M1, the third construction example is used.

The agent device A1 of the above-constructed eleventh embodiment for realizing the path trace function is described in detail referring to the drawings.

The construction of the agent device A1 of the eleventh embodiment is the same as that of the agent device A1 of the seventh embodiment to the tenth embodiment. Therefore the explanation of the construction is omitted.

The operation of the agent device A1 of the eleventh embodiment is described referring to the drawing.

Figure 32:
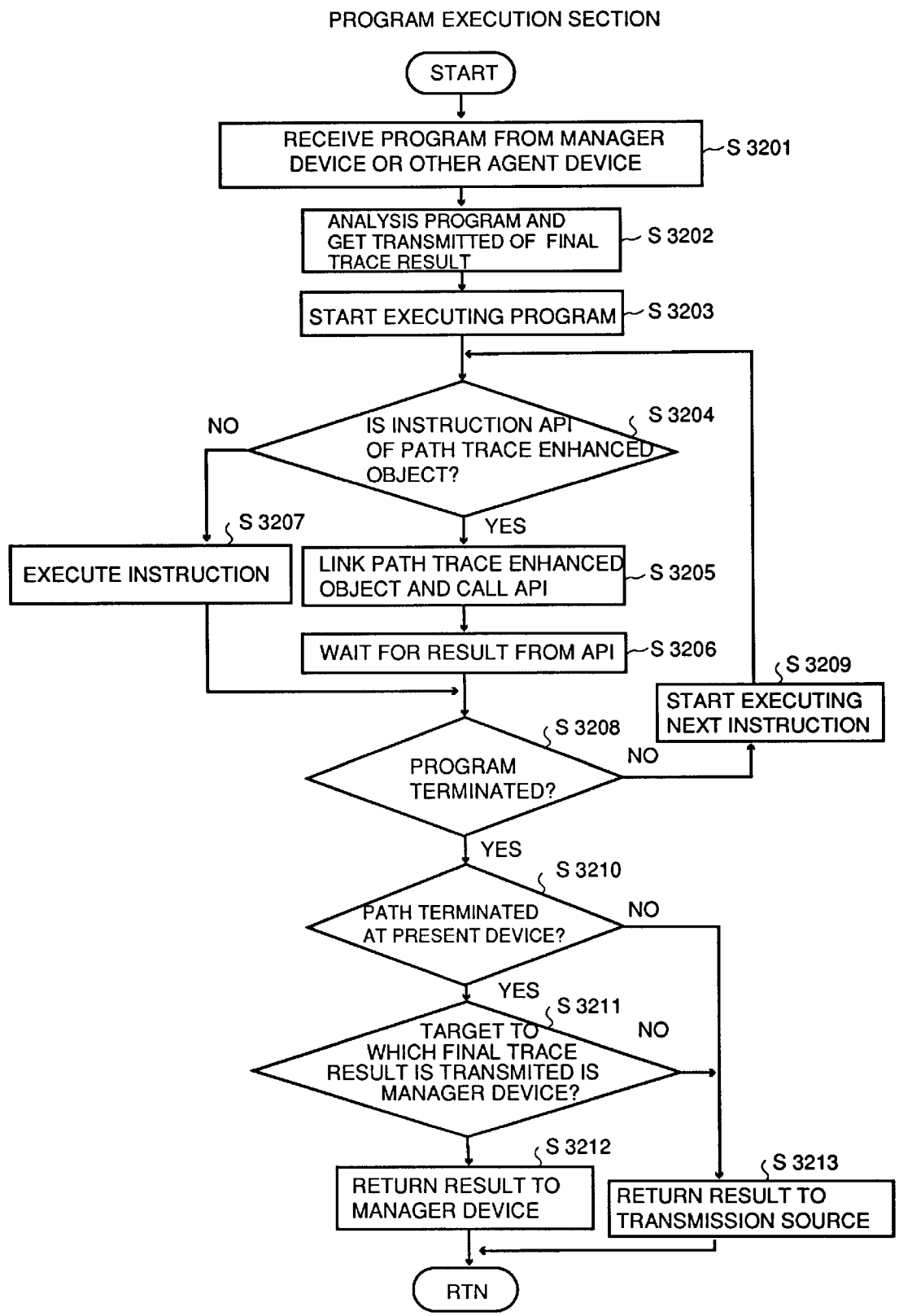
FIG. 32 is a flowchart representing a flow of operations executed by a program execution section of an agent device of an eleventh embodiment of the present invention.

FIG. 32 is a flowchart representing the operation of the program execution section 2 of the agent device A1 of the eleventh embodiment.

It is assumed that the program execution section 2 receives the program S1 from, for example, the manager device M1 (step S3201). The program execution section 2 obtains the target to which the final result is transmitted from the program S1 (step S3202). The transmission target to which the final result is transmitted is obtained by searching the field describing "transmission target" written in the program S1. The transmission target is designated either as the "manager device M1" or the "agent device at a starting point". The program execution section 2 starts executing the program S1 (step S3203).

The program execution section 2 checks if the instruction intended for execution is identical to the API supplied by the path trace enhanced object PE1 (step S3204).

When the result at step S3204 shows that the instruction is identical to the API supplied by the path trace enhanced object PE1, the program execution section 2 links the path trace enhanced object PE1 and calls the API (step S3205). In addition to the abstract name of the path for tracing or the device at a path starting point as the argument, the transmission target to which the final result is transmitted is also designated. The program execution section 2 waits until it receives the result from the API (step S3206).

Figure 33:
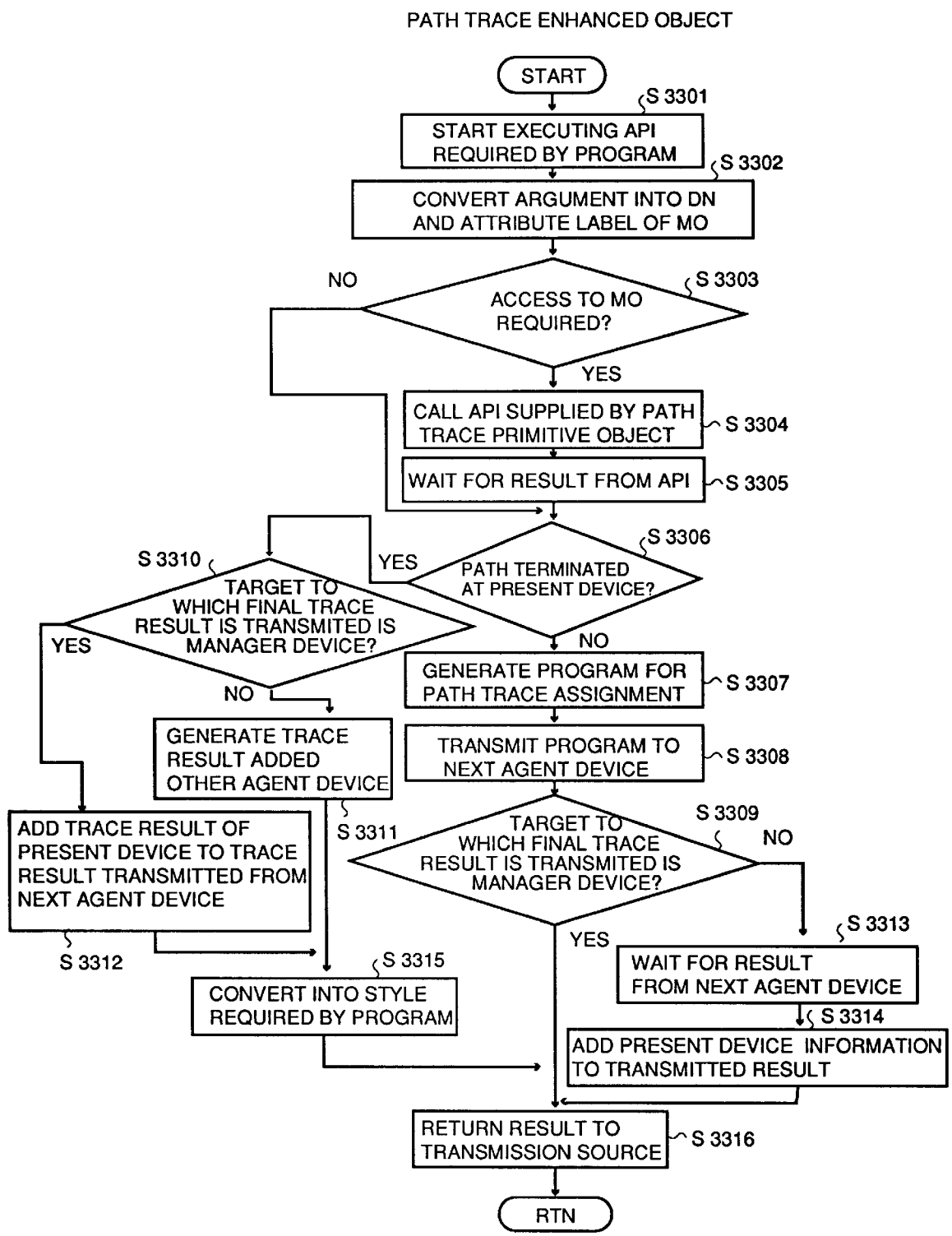
FIG. 33 is a flowchart representing a flow of operations of a path trace enhanced object of the agent device of the eleventh embodiment of the present invention.
Figure 34:
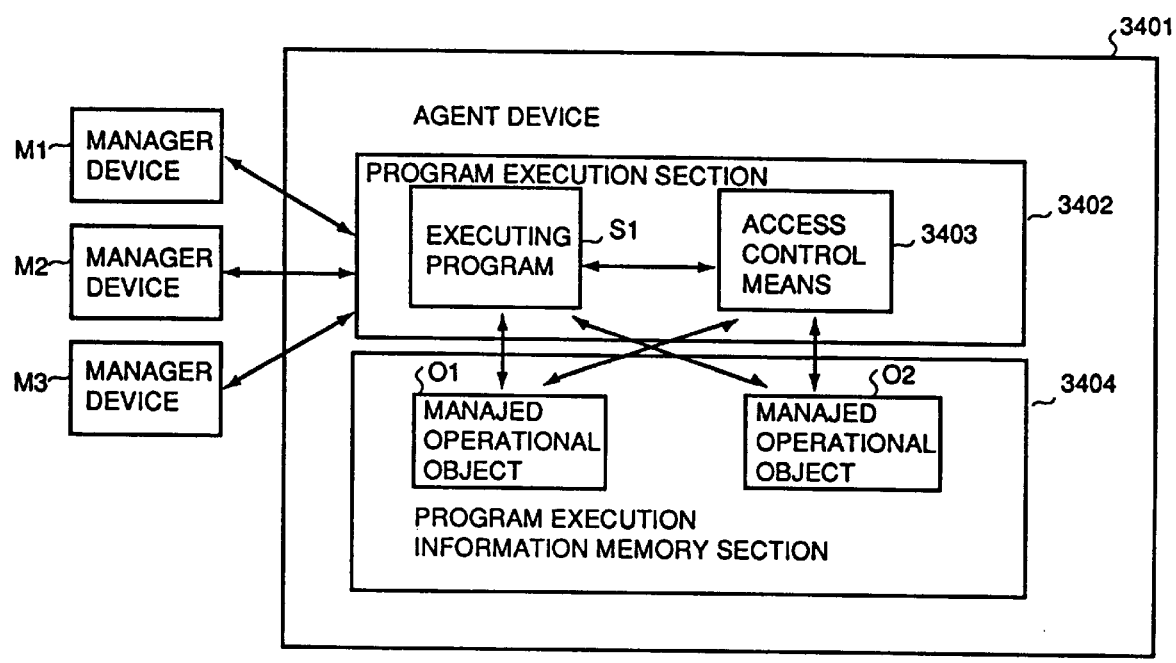
FIG. 34 is a block diagram showing an example of a conventional agent device with program reception function.
Figure 35:
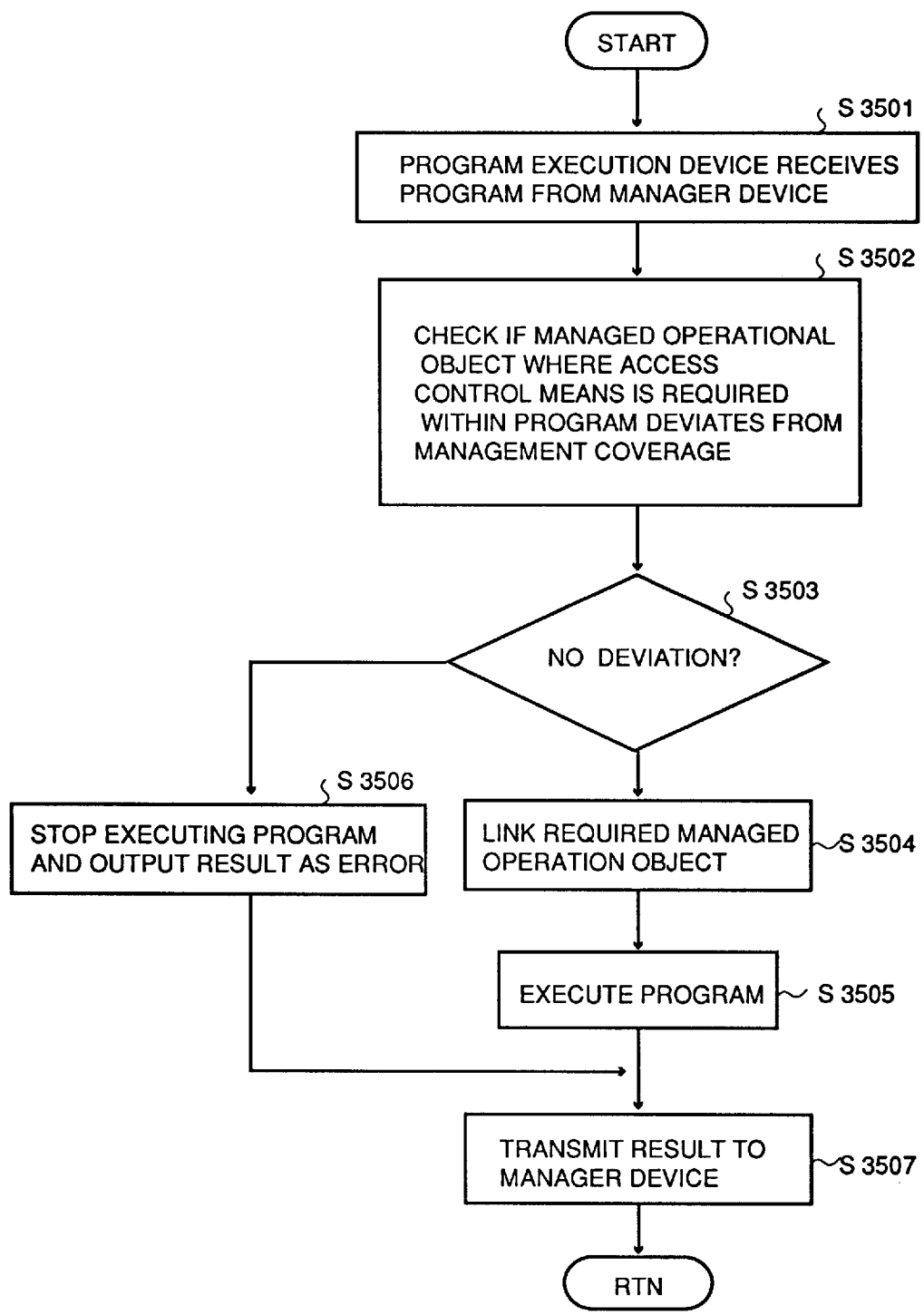
FIG. 35 is a flowchart representing a flow of operations of the conventional agent device with program reception function.

The path trace enhanced object PE1 starts executing the process shown in FIG. 33.

The path trace enhanced object PE1 starts executing the API required by the program S1 (step S3301). The path trace enhanced object PE1 converts the abstract name given as the argument into the DN and attribute label of the managed object written in the application language data type (step S3302). The name conversion table stored in the program execution information memory section 3 is used for the conversion. The path trace enhanced object PE1 checks if the access to the managed object is required (S3303).

When the result at step S3303 shows that the access to the managed object is required, the path trace enhanced object PE1 calls the API supplied by the path trace : primitive object, for example, PP1 (step S3304). The argument given at this time is formed as the DN and attribute label of the managed object converted at step S3302. The path trace enhanced object PE1 waits until it receives the result from the API (step S3305).

The path trace primitive object PP1 executes the process shown in FIG. 22.

The subsequent operation of the path trace enhanced object PE1 is described below.

When the result at step S3303 shows that the access to the managed object is not required, or the result at step S3305 shows that the result is returned from the API supplied by the path trace primitive object PP1, the path trace enhanced object PE1 checks if the present device is at a path terminal point (step S3306). This process is executed by referring to the return value of the API supplied by the path trace primitive object PP1.

When the result at step S3306 shows that the present device is at the path terminal point, the path trace enhanced object PE1 further checks if the transmission target to which the final trace result is transmitted is the manager device M1 (step S3310). This process is executed by referring to the transmission target that receives the trace result given as the argument when the API is called.

When the result at step S3310 shows that the transmission target to which the trace result is transmitted is the manager device M1, the path trace enhanced object PE1 generates the trace result by adding the trace result executed by the present device to the trace result transmitted from other agent devices (step S3312). The path trace enhanced object PE1 processes the trace result into the style required by the program S1 (step S3315). This process includes the process for converting the path route into the abstract expression, "node_A, node_B, . . . ". The name conversion table stored in the program execution information memory section 3 is used for the conversion. The path trace enhanced object PE1 returns the result to the program S1 (step S3316).

When the result at step S3310 shows that the transmission target to which the trace result is transmitted is not the manager device M1, the path trace enhanced object PE1 generates the first trace result propagated to or from other agent device (step S3311). The path trace enhanced object PE1 processes the trace result into the style required by the program S1 (step S3315). This process includes the process for converting the path terminal point into the abstract expression such as "node_A". The name conversion table stored in the program execution information memory section 3 is used for the conversion. The path trace enhanced object PE1 returns the result to the program S1 (step S3316).

When the result at step S3306 shows that the present device is not at the path terminal point, the path trace enhanced object PE1 generates the program for path trace assignment to the next agent device (step S3307). The program generated at step S3307 is obtained by adding information of the DN and attribute label of the managed object intended for access and identifier of the agent device as the transmission source to the program template preliminarily stored in the program execution information memory section 3. The path trace enhanced object PE1 transmits the program to the next agent device (step S3308). The next agent device to which the program is transmitted is determined by searching the connection information of the physical link stored in the program execution information memory section 3. The path trace enhanced object PE1 checks if the transmission target to which the trace result is transmitted is the manager device M1 (step S3309).

When the result at step S3309 shows that the transmission target of the trace result is not the manager device M1, the path trace enhanced objet PE1 waits until it receives the execution result of the program from the next agent device that has transmitted the program (step S3313). The path trace enhanced object PE1 adds the trace result of the present device to the transmitted trace result (step S3314). The trace result to be added is obtained by connecting the DN and attribute label of the managed object written in the application language data type into the abstract name using the name conversion table stored in the program execution information memory section 3. The path trace enhanced object PE1 returns the result to the program (step S3316).

When the result at step S3309 shows that the transmission target to which the trace result is transmitted is the manager device M1, the path trace enhanced object PE1 returns the result of transmitting the program to the next agent device at step S3308 to the program S1 (step S3316).

The subsequent operation of the program execution section 2 is described below.

When the result at step S3204 shows that the instruction intended for execution is not identical to the API supplied by the path trace enhanced object PE1, the program execution section 2 executes the instruction (step S3207). The program execution section 2 checks if the program S1 is terminated with the instruction executed at step S3207 or step S3206.

When the result at step S3208 shows that the program S1 is not terminated, the program execution section 2 starts executing the next instruction (step S3209).

When the result at step S3208 shows that the program S1 is terminated, the program execution section 2 checks if the path is terminated at the present device (step S3210).

When the result at step S3210 shows that the path is terminated at the present device, the program execution section 2 further checks if the transmission target to which the final trace result is transmitted is the manager device M1 (step S3211).

When the result at step S3211 shows that the transmission target of the trace result is the manager device M1, the program execution section 2 transmits the result to the manager device M1 (step S3212).

When the result at step S3211 shows that the transmission target of the trace result is not the manager device M1, the program execution section 2 transmits the result to the transmission source of the program S1 (step S3213).

When the result at step S3210 shows that the path is not terminated at the present device, the result of transmitting the program to the next agent device is transmitted to the transmission source of the program S1 (step S3213).

When the result at step S3208 shows that the program S1 is not terminated, the program execution section 2 starts executing the next instruction (step S3209).

As described above, the present invention provides the agent device with the enhanced operational object, primitive operational object and managed object access object. Functions and operations of the respective objects are clearly defined so as to specify the method of accessing the managed object. The primitive operational object can be operated simultaneously with the managed object access object so that efficiency of accessing the managed object is further improved.

Writing the API supplied by the enhanced operational object into the program may allow for the use of management functions supplied by the enhanced operational object. As the abstract name that can be easily understood to the manager is used to represent the argument given to the API, the program description is further simplified.

The enhanced operational object that executes more sophisticated management can be defined by combining APIs supplied by the enhanced operational objects. Therefore the management function requiring complicated processing can be realized as well as simply collecting the attribute information of the managed objects. The present invention allows for flexibility in managing processes at a wide variety of levels.

The entire disclosure of Japanese Patent Application No. 8-221776 filed on Aug. 5, 1996 including specification, claims, drawing and summary are incorporated herein by reference in its entirety.

What is claimed is:

1. An agent device with program reception function comprising:
    management information memory means for storing a managed object;
    program execution information memory means for storing an enhanced operational object for providing a program with a function required for a network management and a primitive operational object for providing said enhanced operational object with a function of accessing said managed object; and
    program execution means including means for executing a program transmitted from a manager device; means for linking said enhanced operational object required within a program being executed to said program; and means for transmitting an execution result of said program to a manager device.

2. The agent device with program reception function of claim 1 comprises managed object operation means for providing an access interface to an existing management system.

3. The agent device with program reception function of claim 1 comprises managed object access object means for providing a program with a function of accessing one managed object simultaneously.

4. An agent device with program reception function comprising:
    a program execution information memory section for storing a managed object access object that provides a program with a function of accessing one managed object simultaneously;
    program execution means including means for executing a program transmitted from a manager device; means for linking a managed object access object required within a program being executed to said program; and means for transmitting an execution result of said program to said manager device; and
    management information memory section for storing a managed object.

5. The agent device with program reception function of claim 4 comprises managed object operation means for providing an access interface to an existing management system.

6. An agent device with program reception function comprising:
    management information memory means for storing a managed object;
    a program execution information memory section for storing an enhanced operational object providing a program with a function required for a network management; a primitive operational object providing said enhanced operational object with a function of accessing said managed object and a managed object access object providing a program with a function of accessing one managed object simultaneously; and
    program execution means including means for executing a program transmitted from a manager device; means for linking an enhanced operational object required within a program being executed to said program; means for linking a managed object access object required within a program being executed to said program; and means for transmitting an execution result of said program to a manager device.

7. The agent device with program reception function of claim 6 comprises managed object operation means for providing an access interface to an existing management system.

8. A method of accessing a managed object of an agent device comprising the steps of:
    providing an agent device with an enhanced operational object for supplying a first API to a program, a primitive operational object for supplying a second API to said enhanced operational object and an execution section for executing said program; wherein said first API governs an interface between said program and said enhanced operational object and said second API governs an interface between said enhanced operational object and a managed object;

said first API is described in a program transmitted from a manager device; and said agent device comprises the steps of:

executing said program in said program execution section and linking an enhanced operational object supplying said first API described in said program;

linking a primitive operational object supplying said second API required for executing said first API in said linked enhanced operational object;

accessing said managed object by executing said second API in said linked primitive operational object and transmitting a result of executing a predetermined process to said enhanced operational object; and converting said result into a style required by a program in an enhanced operational object receiving said result and transmitting said converted result to said program execution section.

9. A method of accessing a managed object of an agent device of claim 8, wherein said agent device is further provided with a managed object operation section that supplies a uniform third API to a primitive operational object for accessing a managed object within an existing management system, said agent device comprises the steps of:

linking a managed object operation section that supplies a third API required for executing said second API in said linked primitive operational object; and accessing a managed object by executing said third API in said managed object operation section.

10. A method of accessing a managed object of an agent device, wherein an agent device is provided with a program execution section and a managed object access object that supplies an API for accessing a managed object to a program, said agent device comprises the steps of:

executing a program in said program execution section and linking said program to said managed object access object based on a described API; and executing said API in said managed object access object, accessing a managed object to execute a predetermined process and transmitting an execution result to said program execution section.

11. A method of accessing a managed object of an agent device of claim 10, wherein an agent device is provided with a managed object operation section for supplying a second API to a managed object access object for accessing a managed object within an existing management system, said agent device comprises the step of:

linking said managed object operation section that supplies a second API required for executing said API in said linked managed object access object; and accessing a managed object by executing said second API in said linked managed object operation section.

12. An agent device with program reception function in a network management system comprising a manager device for managing a network and an agent device for managing a device existing on said network comprising:

an information memory section for storing a path trace enhanced object for supplying a method to trace a logical end-to-end path on a network in which a manager device transmits a path trace program containing a path trace request to each agent device existing on a path and a manager device collects each trace result from said agent devices; and a path trace primitive object having a function of obtaining attribute information of a managed object required by said path trace enhanced object;

a program execution section including means for executing a path trace program, means for linking a path trace enhanced object required within a path trace program being executed to said path trace program, and means for transmitting an execution result of said path trace program to a manager device; and a management information memory section for storing a managed object.

13. An agent device with program reception function in a network management system comprising a manager device for managing a network and an agent device for managing a device existing on said network comprising:

an information memory section for storing a path trace enhanced object for supplying a method to trace a logical end-to-end path on a network in which an agent device receiving a path trace program from a manager device transmits said path trace program to each agent device existing on a path intended for tracing and an agent device receiving said path trace program from said manager device transmits a trace result from said each agent device collectively to said manager device; and a path trace primitive object having a function of obtaining attribute information of a managed object required by said path trace enhanced object;

a program execution section including means for executing a path trace program transmitted from a manager device, means for linking a path trace enhanced object required within a path trace program being executed to said path trace program and means for transmitting an execution result of said path trace program to a manager device; and a management information memory section having a function of storing a managed object.

14. An agent device with program reception function in a network management system comprising a manager device for managing a network and an agent device for managing a device existing on said network comprising:

an information memory section for storing a path trace enhanced object for supplying a method to trace a logical end-to-end path on a network in which an agent device receiving a path trace program from a manager device transmits said path trace program to a next agent device, said next agent device further transmits said path trace program to an agent device next thereto for propagating said path trace program to agent devices on a path and execution result of each path trace program is transmitted to a transmission source of said path trace program for propagating a final path trace result to an agent device that has received said path trace program from said manager device and a propagation result is transmitted to said manager device; and a path trace primitive object having a function of obtaining attribute information of a managed object required by said path trace enhanced object;

a program execution section including means for executing a path trace program transmitted from a manager device; means for linking a path trace enhanced object required within a path trace program being executed to said path trace program and means for transmitting an execution result of said path trace program to a manager device; and a management information memory section for storing a managed object.

15. An agent device with program reception function in a network management system comprising a manager device for managing a network and an agent device for managing a device existing on said network comprising:

an information memory section for storing a path trace enhanced object for supplying a method to trace a logical end-to-end path on a network in which an agent device receiving a path trace program from a manager device transmits a path trace program added with a trace result executed within its present device to a next agent device, said next agent device transmits a path trace program added with a trace result executed within its present device to an agent device next thereto for propagating a path trace program containing trace results executed within each present device to agent devices on a path and a final path trace result received by an agent device at the other path end is transmitted to said manager device; and a path trace primitive object having a function of obtaining attribute information of a managed object required by said path trace enhanced object;

a program execution section including means for executing a path trace program transmitted from a manager device, means for linking a path trace enhanced object required within a path trace program being executed to said path trace program and means for transmitting an execution result of said path trace program to a manager device; and a management information memory section for storing a managed object.

16. An agent device with program reception function in a network management system comprising a manager device for managing a network and an agent device for managing a device existing on said network comprising:

an information memory section for storing a path trace enhanced object for supplying a path trace method to trace a logical end-to-end path on a network by combining one path trace method in which an agent device receiving a path trace program from a manager device transmits said path trace program to a next agent device, said next agent device transmits said path trace program to an agent device next thereto for propagating said path trace program to agent devices on a path, an execution result of said each path trace program is transmitted to a transmission source of said path trace program for propagating a final path trace result from said manager device to an agent device that has received said path trace program and a propagation result is transmitted to said manager device and the other path trace method in which an agent device receiving a path trace program from a manager device transmits a path trace program containing a trace result executed within each present device to a next agent device, said next agent device transmits a path trace program containing a trace result executed within its present device to an agent device next thereto for propagating a path trace program containing a trace result executed within its present device to agent devices on a path and a final path trace result received by an agent device at the other path end is transmitted to said manager device; and a path trace primitive object having a function of obtaining attribute information of a managed object required by a path trace enhanced object;

a program execution section including means for executing a path trace program transmitted from a manager device, means for linking a path trace enhanced object required within a path trace program being executed to said path trace program, and means for transmitting an execution result of said path trace program to a manager device; and a management information memory section for storing a managed object.

* * * * *